United States Patent
Kono et al.

(10) Patent No.: US 8,694,232 B2
(45) Date of Patent: Apr. 8, 2014

(54) METHOD OF PREDICTING ENERGY CONSUMPTION, APPARATUS FOR PREDICTING ENERGY CONSUMPTION, AND TERMINAL APPARATUS

(75) Inventors: Toshiaki Kono, Ashford (GB); Takumi Fushiki, Hitachi (JP)

(73) Assignee: Clarion Co., Ltd, Tokyo (JP)

( * ) Notice: Subject to any disclaimer, the term of this patent is extended or adjusted under 35 U.S.C. 154(b) by 507 days.

(21) Appl. No.: 12/805,846

(22) Filed: Aug. 20, 2010

(65) Prior Publication Data

US 2011/0060495 A1 Mar. 10, 2011

(30) Foreign Application Priority Data

Sep. 9, 2009 (JP) ................................. 2009-208001

(51) Int. Cl.
*G06F 19/00* (2011.01)
*G01C 21/00* (2006.01)
*G08G 1/123* (2006.01)

(52) U.S. Cl.
USPC ....................... 701/123; 701/439; 340/995.24

(58) Field of Classification Search
USPC ......... 701/410, 424, 423, 117, 411, 439, 123, 701/24, 93, 96, 29.1, 29.3, 519, 114; 345/419; 340/991, 993, 994, 988, 340/995.11, 995.12, 995.1–996
See application file for complete search history.

(56) References Cited

U.S. PATENT DOCUMENTS

| 5,913,917 | A | * | 6/1999 | Murphy ........................ 701/123 |
| 2010/0017110 | A1 | | 1/2010 | Sengoku et al. |
| 2010/0087977 | A1 | | 4/2010 | Bonne |
| 2010/0114473 | A1 | | 5/2010 | Kono et al. |

FOREIGN PATENT DOCUMENTS

| CN | 101490507 | | 7/2009 |
| DE | 10 2007 007 955 | | 8/2008 |
| EP | 2 042 831 | | 4/2009 |
| JP | 09-297034 | | 11/1997 |
| JP | 2002-350152 | | 12/2002 |
| JP | 2004-145727 | * | 5/2004 |
| JP | 2006-098174 | * | 4/2006 |
| JP | 2008-020382 | | 1/2008 |
| JP | 2010-107459 | | 5/2010 |

OTHER PUBLICATIONS

Chinese Office Action for Chinese Patent Application No. 201010262151.6.

* cited by examiner

*Primary Examiner* — Muhammad Shafi
(74) *Attorney, Agent, or Firm* — Antonelli, Terry, Stout & Kraus, LLP.

(57) ABSTRACT

An object of the invention is to predict energy consumptions of a vehicle, using geographic characteristic values which are independent from particular driving patterns and vehicle parameters and unique to respective links. A navigation server predicts energies which are consumed when a vehicle runs on links. The navigation server calculates geographic characteristic values of respective links, the geography of the each link affecting the consumption energy with the geographic characteristic values, the calculation being based on energy consumptions collected from probe vehicles, and calculates predicted energy consumption of each link selected as a processing target, based on the geographic characteristic values. A navigation terminal obtains these predicted energy consumptions and performs route search with the obtained predicted energy consumptions as costs.

9 Claims, 18 Drawing Sheets

FIG.2

Probe transmission data format

| Vehicle type data | | Vehicle type A | |
|---|---|---|---|
| Unit ID | | 001 | |
| Link data | | | |
| Link number | Passage date-time | Travel time [sec.] | Energy consumption [J] |
| 1 | 2008/12/25 08:45:12 | 50 | 1462000 |
| 2 | 2008/12/25 08:47:02 | 110 | 2176000 |
| 3 | 2008/12/25 08:47:37 | 35 | 1734000 |
| ⋮ | ⋮ | ⋮ | ⋮ |

FIG.3

Probe data DB format

Probe data DB    131

| Link number | Vehicle type data | Unit ID | Passage date-time | Travel time [sec.] | Energy consumption [J] |
|---|---|---|---|---|---|
| 1 | Vehicle type A | 001 | 2008/12/25 08:45:12 | 50 | 1462000 |
| 2 | Vehicle type A | 001 | 2008/12/25 08:47:02 | 110 | 2176000 |
| 3 | Vehicle type A | 001 | 2008/12/25 08:47:37 | 35 | 1734000 |
| ... | ... | ... | ... | ... | ... |

FIG.4

Vehicle parameter DB format 133

| Vehicle type data | Vehicle | Vehicle weight [kg] | Basic consumption coefficient [J/sec] (F) | Energy conversion efficiency (e) | Energy transmission efficiency ($\eta$) | Regeneration efficiency ($\varepsilon$) | Air drag coefficient [kg/m] |
|---|---|---|---|---|---|---|---|
| Vehicle type A | Internal combustion engine | 1600 | 12000 | 0.42 | 0.9 | 0 | 0.3 |
| Vehicle type B | Electric | 1000 | 2000 | 0.60 | 0.9 | 0.5 | 0.28 |
| ... | ... | ... | ... | ... | ... | ... | ... |

Concept of estimating driving pattern

Driving pattern analysis processing (S107)

FIG.9

Geographic characteristic value DB format 134

| Link number | Creation date-time | Reliability degree | $M_{ACC}$ | $M_{CONST}$ | $M_{DEC}$ | $K_{ACC}$ | $K_{CONST}$ | $K_{DEC}$ |
|---|---|---|---|---|---|---|---|---|
| 5 | 2008/11/12 | 20 | -53 | 21 | 3 | 0 | -15 | -1 |
| 9 | 2008/10/24 | 144 | 6 | 9 | 14 | 2 | -54 | -3 |
| 3 | 2008/12/25 | 50 | -10 | 4 | 45 | -10 | -14 | -30 |
| ... | ... | ... | ... | ... | ... | ... | ... | ... |

FIG.10

Predicted energy consumption request format

| Vehicle type data | Vehicle type A |
|---|---|
| Unit ID | 002 |
| Request made time | 2008/12/24 10:29:35 |
| Request link number list | |
| 5 | |
| 19 | |
| 3 | |
| 30 | |
| ⋮ | |

Predicted-energy-consumption delivery data format

| Unit ID | | 002 |
|---|---|---|
| Prediction result list | | |
| Link number | Predicted energy consumption [J] | Predicted travel time [sec] |
| 5 | 54545 | 11 |
| 19 | 6335475 | 42 |
| 3 | 1600000 | 36 |
| 30 | 2445787 | 45 |
| ⋮ | ⋮ | ⋮ |

Route search processing

FIG.17

Geographic characteristic value delivery request format

| Unit ID | 002 |
|---|---|
| Update target link request ||
| 5 ||
| 19 ||
| 3 ||
| ⋮ ||

FIG.19

Geographic characteristic value delivery data format

| Destination unit ID | 002 | | | | | | | |
|---|---|---|---|---|---|---|---|---|
| Link number | Creation date-time | Reliability degree | $M_{ACC}$ | $M_{CONST}$ | $M_{DEC}$ | $K_{ACC}$ | $K_{CONST}$ | $K_{DEC}$ |
| 5 | 2008/11/12 | 7 | -53 | 21 | 3 | 0 | -15 | -1 |
| 9 | 2008/10/24 | 144 | 6 | 9 | 14 | 2 | -54 | -3 |
| 3 | 2008/12/25 | 50 | -10 | 4 | 45 | -10 | -14 | -30 |
| ... | ... | ... | ... | ... | ... | ... | ... | ... |

METHOD OF PREDICTING ENERGY CONSUMPTION, APPARATUS FOR PREDICTING ENERGY CONSUMPTION, AND TERMINAL APPARATUS

CROSS REFERENCE TO RELATED APPLICATION

The application claims the foreign priority benefit under Title 35, United States Code, §119(a)-(d) of Japanese Patent Application No. 2009-208001, filed on Sep. 9, 2009, the contents of which are hereby incorporated by reference.

BACKGROUND OF THE INVENTION

1. Field of the Invention

The present invention relates to a technology for a method of predicting energy consumption, an apparatus for predicting energy consumption, and a terminal apparatus.

2. Description of the Related Art

Efficient usage of energy for vehicles has become an issue due to the development of environmental problems and the like. Therefore, for example, for a navigation system for prediction of energy consumption, an energy saving technology that searches a route that requires less energy consumption and the like have been devised. In such an energy saving technology, it is necessary to predict the energy consumption of a vehicle. Energy consumption referred to herein includes both electrical energy consumption and fuel consumption.

As a method of predicting the energy consumed by a vehicle for driving, presented are a method using a physical model for calculation of the energy consumption of a vehicle and a method based on actual values of energy consumption in the past.

As a method using a physical model, a method is presented that performs calculation from the equations of motion, using the three dimensional shape of a road, a result of prediction of the driving pattern with respect to the driving velocity and acceleration/deceleration of a vehicle, vehicle parameters representing the characteristics of energy consumption categorized by vehicle, and the like.

As a method based on actual values of energy consumption in the past, a method is presented that collects data on energy consumption, velocity, vehicle type, etc. by probe vehicles, and performs prediction at the time of prediction, based on actual results of collected data in the past. Herein, a probe vehicle refers to a vehicle that transmits data obtained by a sensor mounted on the vehicle and operational history of a driver to a navigation server by communication means such as wireless wave, a LAN (Local Area Network), internet connection by a wireless LAN, a mobile phone, or the like.

An example of prediction of energy consumption based on collected data (actual results) by probe vehicles is a technology disclosed by Japanese Patent Application Laid-open No. 2008-20382. In this technology, first, a navigation server collects, by probe vehicles, data on fuel consumption on respective road sections, identification data for identifying vehicle types and models, and operation data which indicates the velocity and acceleration/deceleration of vehicles and the operation of devices. Then, the navigation server builds a database in which fuel consumptions are sorted by the identification data and the operation data and are statistically processed. At the time of predicting fuel consumption, a result of searching data, from the database, that corresponds to the identification data and operation data on a target vehicle is used as prediction of the fuel consumption.

SUMMARY OF THE INVENTION

Problems to be Solved by the Invention

In a method using a physical model as described above, if data on the three dimensional shape of a road is not well prepared or has low accuracy, a problem will be caused that prediction of energy consumption cannot be performed or the accuracy of prediction is lowered.

In a method based on the actual results by probe vehicles, a problem will be caused that energy consumption to be calculated from operational information on a vehicle type, for which data has not been collected in the past or the number of samples is small, cannot be predicted or the accuracy of prediction is lowered. Still further, in order to perform prediction of energy consumption for all vehicle types and operational information, it is necessary to use a large number of probe vehicles or to collect data for a long period.

The invention has been developed with a view to address the above-described background, and an object of the invention is to predict energy consumption of a vehicle, using geographic characteristic values unique to respective links, which are independent from particular driving patterns and vehicle parameters.

Means for Solving the Problem

To solve the above-described problems, a method in accordance with the invention includes calculating geographic characteristic values of each link based on the data of the energy consumption collected by the probe vehicles, wherein the geography of the link affects energy consumption with the geographic characteristic values thereof, and calculating a predicted energy consumption of each link selected as a processing target, based on the geographic characteristic values.

BRIEF DESCRIPTION OF THE DRAWINGS

FIG. 2 is a diagram showing an example of a format of probe transmission data in the first embodiment;

FIG. 3 is a diagram showing an example of a format of a probe DB in the first embodiment;

FIG. 4 is a diagram showing an example of a format of a vehicle parameter DB in the first embodiment;

FIG. 9 is a diagram showing an example of a format of a geographic characteristic value DB in the first embodiment;

FIG. 10 is a diagram showing an example of a format of a request for predicted energy consumption transmitted from a navigation terminal;

FIG. 17 is a diagram showing an example of a format of a request for delivery of geographic characteristic values in the second embodiment;

FIG. 19 is a diagram showing an example of a format of delivery data on geographic characteristic values in the second embodiment.

DETAILED DESCRIPTION OF THE PREFERRED EMBODIMENTS

Figure 1:
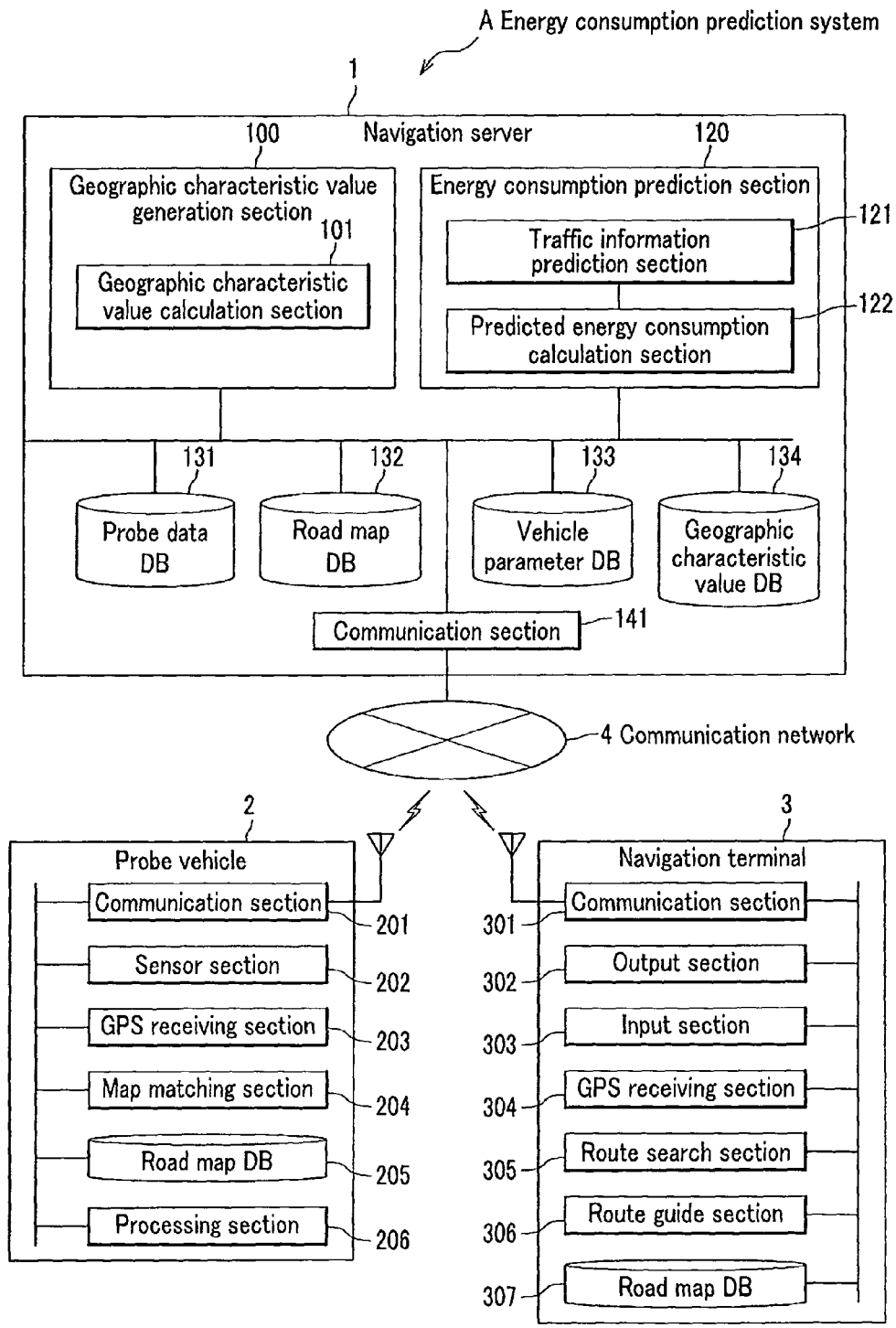
FIG. 1 is a diagram showing an example of a configuration of a system for predicting energy consumption in a first embodiment.

Embodiments for carrying out the invention will be described below, appropriately referring to the drawings.

First Embodiment

First, a first embodiment in accordance with the invention will be described, referring to FIGS. 1 to 15.
System Configuration FIG. 1 is a diagram showing an example of a configuration of a system for predicting energy consumption in a first embodiment.

An energy consumption prediction system A includes a navigation server (hereinafter, referred to as the navigation server 1), navigation terminals (hereinafter, referred to as navigation terminals 3), and probe vehicles 2 which are capable of communicating with each other via a communication network 4. The communication network 4 is implemented by a wireless LAN, a LAN, Internet connection via a wireless LAN, a mobile phone network, or the like.

A probe vehicle 2 has a function to transmit a vehicle type, link data, and the like to the navigation server 1. The probe vehicle 2 includes a communication section 201, a sensor section 202, a GPS (Global Positioning System) receiving section 203, a map matching section 204, a road map DB (Data Base) 205, and a processing section 206.

The sensor section 202 has a function to measure the energy consumption of the probe vehicle 2 itself. As to measurement of the energy consumption, the power consumption is measured with a watthour meter for an electric vehicle, and is measured with a fuel flowmeter or from a result of multiplying the measured value of a valve opening time of an injector by the injection amount per unit time for an internal combustion engine vehicle.

The GPS receiving section 203 has a GPS function to collect time and coordinates.

The road map DB 205 is implemented by a storage device storing a road map. The road map is formed of a group of links forming roads, wherein each link is given with link information including a link number, a link length, a road class such as a highway or an open road, link coordinates, and connection relation with other links, as attribute information. Further, link information may include the speed limit on the link and the like. Incidentally, a link represents a certain section on a road, a section from an intersection to another inter section for example, and is a unit element forming a road map. In the present embodiment, inbound and outbound roads are assumed to be stored individually as different links. Further, in the present embodiment, it is assumed that information on links stored in the road map DB is referred to as link information, and information on links transmitted from the probe vehicle 2 is referred to as link data, for distinction.

The map matching section 204 identifies a link where the probe vehicle 2 has run by map matching with a link included in the road map, based on information on the time and coordinates obtained by the GPS receiving section 203. The processing section 206 of the probe vehicle 2 calculates the time of passage, the travel time, and the energy consumption of each link, from the result of identification and data on energy consumption obtained by the sensor section 202.

The data obtained by the probe vehicle 2 on the time of passage, the travel time, the energy consumption, and the like of each link are transmitted via the communication section 201 and the communication network 4 to the navigation server 1, together with the unit ID identifying the probe vehicle 2, vehicle type data identifying the vehicle type of the probe vehicle 2 itself, and the like, as probe transmission data. An example of probe transmission data will be described later, referring to FIG. 2.

The navigation server 1 includes a communication section 141, a probe data DB 131, a road map DB 132, a vehicle parameter DB 133, a geographic characteristic value DB 134, a geographic characteristic value generation section 100, and an energy consumption prediction section 120.

The communication section 141 has a function to communicate with probe vehicles 2 and navigation terminals 3 via the communication network 4.

The probe data DB 131 is implemented by a storage device that stores probe transmission data, which the communication section 141 has received from probe vehicles 2, in a format described later referring to FIG. 3.

The road map DB 132 is similar to the road map DB 205 on a probe vehicle 2.

The vehicle parameter DB 133 is implemented by a storage device that stores parameters representing the characteristics of energy consumption of respective vehicle types in a format described later referring to FIG. 4.

The geographic characteristic value generation section 100 has a geographic characteristic value calculation section 101 that calculates geographic characteristic values, based on energy consumptions obtained from probe vehicles 2 and information on links. The calculated geographic characteristic values are stored in a geographic characteristic value DB 134 in a format described later referring to FIG. 9.

The energy consumption prediction section 120 includes a traffic information prediction section 121 and a predicted energy consumption calculation section 122.

The traffic information prediction section 121 has a function to calculate a predicted link travel time of each target link by obtaining a travel time at the estimated time of passing the target link from statistical traffic information created by sorting link travel times in the past by day type and time zone and statistically processing them, and then deliver the calculated predicted link travel time to the predicted energy consumption calculation section 122.

The predicted energy consumption calculation section 122 has a function to predict the energy consumption of each target link, based on the predicted link travel time delivered from the traffic information prediction section 121 and the geographic characteristic values. The predicted energy consumption and the information on the target link for prediction are transmitted by the communication section 141 via the communication network 4 to a navigation terminal 3.

A navigation terminal 3 includes a communication section 301, an output section 302, an input section 303, a GPS receiving section 304, a route search section 305, a route guide section 306, and a road map DB 307.

The communication section 301 has a function to communicate with the navigation server 1 via the communication network 4.

The output section 302 includes a display device such as an LCD (Liquid Crystal Display) and is capable of displaying arbitrary graphics and characters in color.

The input section 303 is arranged as buttons provided on the navigation terminal 3 or a touch panel incorporated with the LCD of the output section 302, and receives various inputs from a user.

The GPS receiving section 304 has a function to obtain the current coordinates of the vehicle itself by a GPS function.

The road map DB 307 is similar to the road map DBs 205 and 132 stored respectively in the probe vehicle 2 and the navigation server 1, and description of the road map DB 307 will be omitted.

The route search section 305 is provided with a function to search a route that minimizes the energy consumption between a departure point and a destination (the minimum energy-consumption route), using a minimum-cost route search algorithm such as Dijkstra's algorithm together with information on connection between links in the road map, wherein respective predicted energy consumptions are taken to be the cost of links. The searched minimum energy-consumption route is transmitted to the route guide section 306.

The route guide section 306 displays information on the minimum energy-consumption route delivered from the route search section 305 on the output section 302 together with the road map DB 307 and the current position of the vehicle itself obtained from the GPS receiving section 304. Following a guidance by the navigation terminal 3, the driver can drive the vehicle on a route with the minimum energy consumption.

Probe Transmission Data

FIG. 2 is a diagram showing an example of a format of probe transmission data in the first embodiment.

Probe transmission data is transmitted from a probe vehicle 2 to the navigation server 1.

The probe transmission data is a data set of vehicle type data representing the vehicle type of the probe vehicle 2, unit ID (Identification) of a data collecting device (not shown) mounted on the probe vehicle 2, and link data related to links where the probe vehicle 2 has run.

Further, the link data includes the link number of each target link, the date and time of passing the link, the travel time ([sec]), and the energy consumption ([J]) the probe vehicle has consumed at the link. Incidentally, the date and time of passing a link is ordinarily the date and time of entrance into the link, however, may be the time of passing the intermediate point of the link or the time of arrival at the exit of the link. Further, energy consumption is assumed to be normalized to be an energy amount [J] equivalent to power consumption or fuel consumption so that energy consumption can be commonly handled for both electric vehicles and internal combustion engine vehicles.

Probe Data DB

FIG. 3 is a diagram showing an example of a format of a probe DB in the first embodiment.

In the probe data DB 131, probe transmission data transmitted from probe vehicles 2 are stored successively. The probe data DB 131 includes link numbers, the vehicle type data on probe vehicles 2 having transmitted the probe transmission data, the unit IDs of the collecting devices (not shown) mounted on the probe vehicles 2 having transmitted the probe transmission data, the dates and times of passing the links, travel times ([sec.]) through the links, and energy consumptions ([J]). The respective data shown in FIG. 3 are similar to the respective data shown in FIG. 2, and accordingly detailed description thereof will be omitted.

Vehicle Parameter DB

FIG. 4 is a diagram showing an example of a format of a vehicle parameter DB in the first embodiment.

The vehicle parameter DB 133 stores data on the parameters of respective vehicle types.

The vehicle parameter DB 133 includes vehicle type data, vehicles, vehicle weights ([kg]), basic consumption coefficients ([J/sec]), energy conversion efficiencies, energy transmission efficiencies, regeneration efficiencies, and air drag coefficients ([kg/m]).

The vehicle type data corresponds to the vehicle type data in FIGS. 2 and 3.

The vehicles represent the categories of power sources such as internal combustion engine mounting vehicles, electrical vehicles, and the like.

A vehicle weight is set in advance by adding the deadweight of a vehicle and the average total weight of passengers. The average total weight of passengers can be calculated by multiplying the average number of passengers by the average weight of an adult.

A basic consumption coefficient and an energy conversion efficiency will be described later when geographic characteristic values are described later. An energy transmission efficiency is an amount indicating the ratio between an energy generated by an internal combustion engine or a motor and an energy usable for real driving, taking into account a loss in the driving system including a transmission. A regeneration efficiency represents the ratio between a surplus energy generated by decelerating a vehicle or driving a vehicle on a downward slope and a regenerated energy during driving of an electrical vehicle or the like, wherein the regeneration efficiency is zero for an internal combustion engine vehicle. An air drag coefficient indicates the degree of resistance between a vehicle and air resistance during driving of the vehicle.

Incidentally, a basic consumption coefficient is the proportionality factor F in later-described Expression (5); an energy conversion efficiency is 'e' in later-described Expression (1); and an energy transmission efficiency is η in the later-described Expression (1). Further, a regeneration efficiency is ϵ in Expression (4).

Procedure of Generating Geographic Characteristic Values

Figure 11:
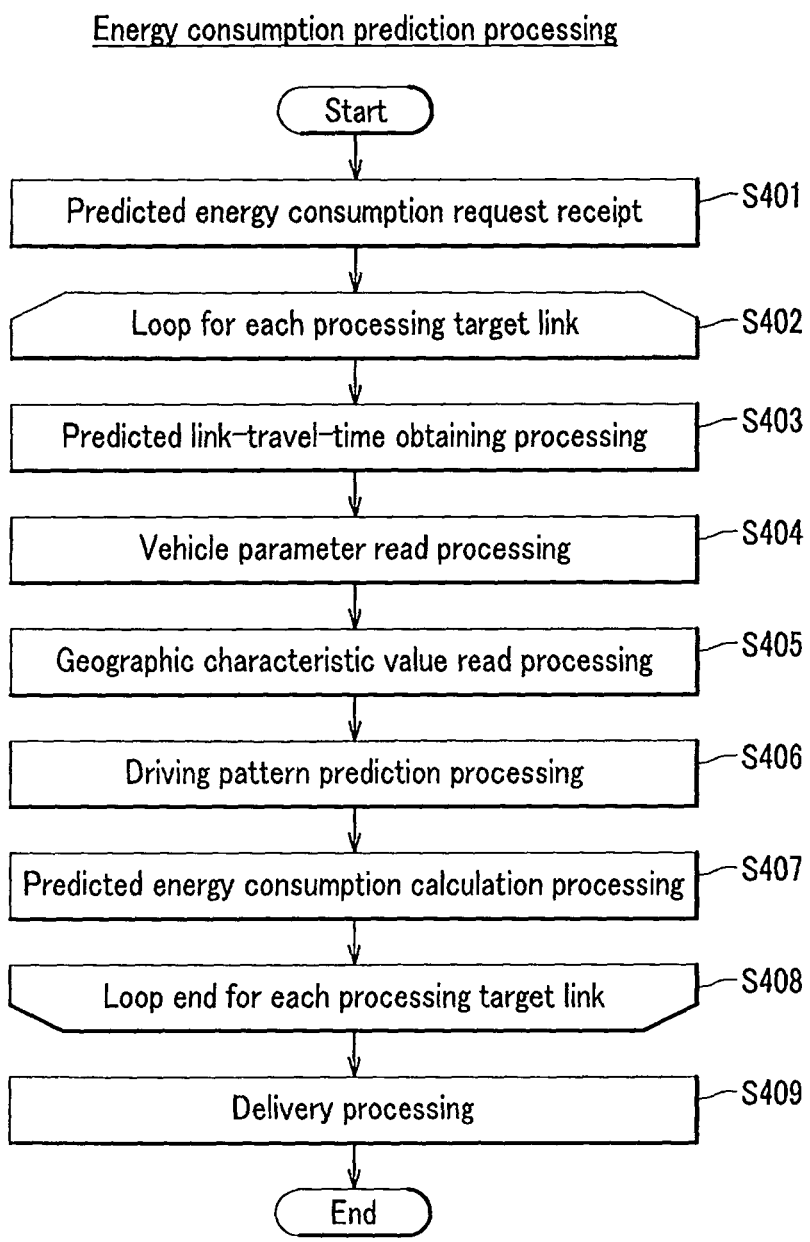
FIG. 11 is a flowchart showing a procedure of processing to predict energy consumption in the first embodiment.
Figures 12, 13:
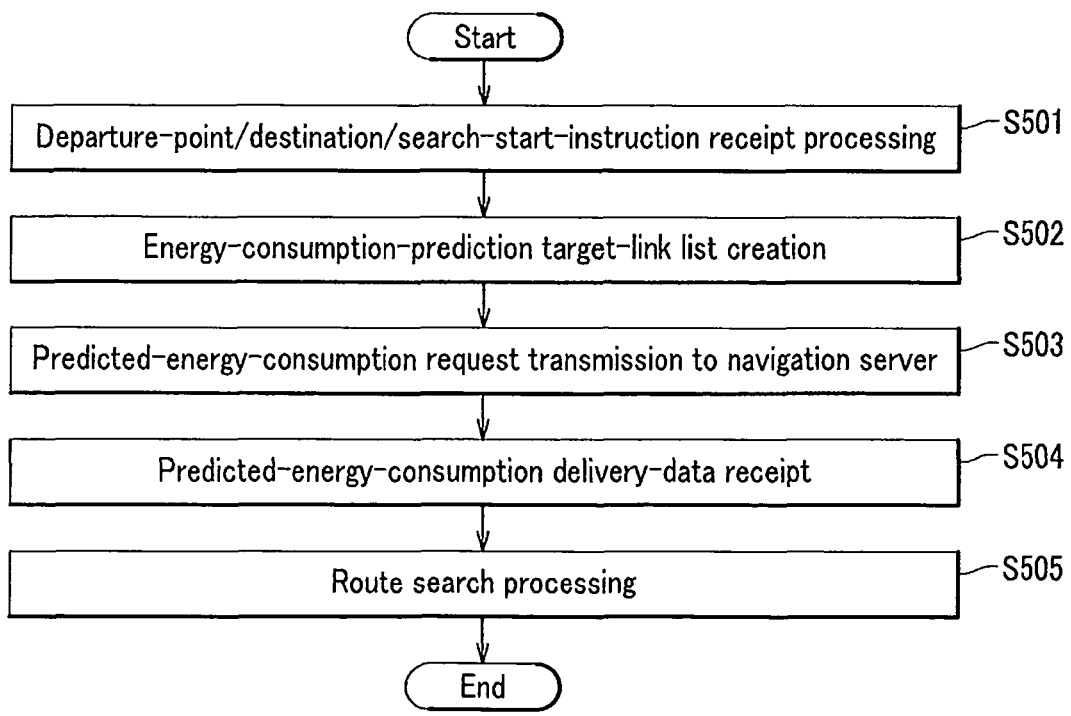
FIG. 12 is a diagram showing an example of a format of delivery data on predicted energy consumption in the first embodiment.
FIG. 13 is a flowchart showing a procedure of processing to search a route in the first embodiment.

The procedure of generating geographic characteristic values in the first embodiment will be described below, referring to FIGS. 5 to 8. In the first embodiment, firstly, the navigation server 1 periodically calculates geographic characteristic values in advance based on data that the navigation server 1 has collected from probe vehicles 2 (FIGS. 5 to 8). Then, upon receipt of a request for prediction of energy consumption on certain links from a navigation terminal 3, the navigation server 1 predicts the energy consumptions on the links, based on geographic characteristic values calculated in advance, and delivers a prediction result to the navigation terminal 3 (FIG. 11). Then, the navigation terminal 3 having received the prediction result of the energy consumptions searches a route, based on the transmitted prediction result (FIG. 13).

Figure 5:
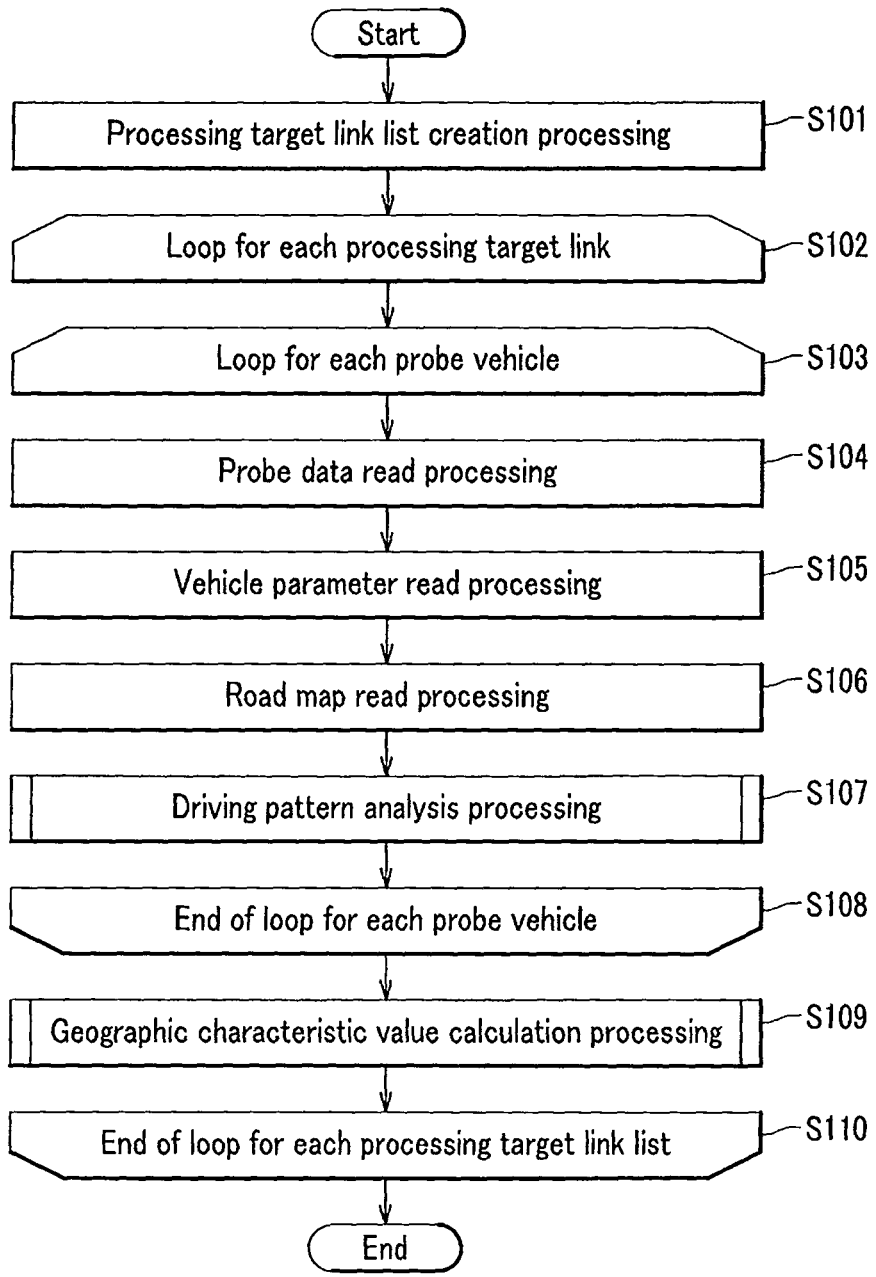
FIG. 5 is a flowchart showing a procedure of processing to generate geographic characteristic values in the first embodiment.

FIG. 5 is a flowchart showing a procedure of processing to generate geographic characteristic values in the first embodiment (refer to FIG. 1 as necessary).

First, the geographic characteristic value calculation section 101 performs processing to create a list of target links for processing (S101). The geographic characteristic value calculation section 101 selects links, according to a reference such as selecting all links in the road map as target links for processing, links on which a certain number or larger number of probe data have been collected, links with which a certain period has elapsed since the last processing to generate geographic characteristic values, or links for which the accuracy of predicting energy consumption is low, or selecting links by a combination of these. Further, using information on the reliability of data, the information being included in the geographic characteristic value DB 134 described later, links with a low degree of reliability may be extracted to be selected as target links for processing. In general, a large number of road links are present. Therefore, by narrowing down target links for processing to calculate geographic characteristic values, with the reference as described above, it is possible to reduce the throughput and perform efficient processing.

Then, the geographic characteristic value calculation section 101 repeats steps S103 to S107 for each created list of target links for processing (S102).

Further, the geographic characteristic value calculation section 101 repeats steps S104 to S107 for each probe vehicle 2 (S103).

The geographic characteristic value calculation section 101 retrieves all probe data on target links for processing from the probe data DB 131 (S104). Herein, a probe data refers to one line of the probe data DB 131 in FIG. 3. In this processing, the geographic characteristic value calculation section 101 extracts each probe data with a key of link number included in the probe data DB 131 shown in FIG. 3, wherein it is also possible to reflect the latest road status by extracting only probe data within a certain period from a certain point of time other than obtaining all probe data of target links for processing. For determining the certain period in this case, it is possible to extract data obtained following the latest processing, for example.

Next, the geographic characteristic value calculation section 101 performs vehicle parameter read processing to read vehicle parameter data corresponding to probe data obtained in step S104, from the vehicle parameter DB 133 (S105). This process is performed such that the geographic characteristic value calculation section 101 reads one corresponding line (vehicle parameter data) from the vehicle parameter DB 133 with a key of the vehicle type data included in the obtained probe data.

Incidentally, in a case where the probe data include data on the vehicle weight and the like obtained by a sensor mounted on the probe vehicle 2 or obtained from an input by the driver, the vehicle weight data in the probe data may be read as the data to be read in step S105.

Then, in step S 106, the geographic characteristic value calculation section 101 performs road map read processing to read information (link information), in the road map, the information corresponding to the links of the respective probe data having been read in step S104. This processing is performed such that the geographic characteristic value calculation section 101 reads information on the corresponding links from the road map DB 132 with a key of the respective link number included in the probe data.

Subsequently, the geographic characteristic value calculation section 101 performs driving pattern analysis processing which will be described later, referring to FIGS. 6 and 7 (step S107).

Then, if the loop processing in steps S104 to S107 is completed for all probe vehicles 2 respectively (S108), the geographic characteristic value calculation section 101 performs geographic characteristic value calculation processing which will be described later, referring to FIG. 8 (S109).

Further, if the loop processing in steps S103 to S109 is completed respectively for all the target links for processing (S110), the geographic characteristic value calculation section 101 terminates the geographic characteristic value generation processing.

Driving Pattern Analysis Processing

Next, the driving pattern analysis processing in step S107 in FIG. 5 will be described, referring to FIGS. 6 and 7.

Figure 6:
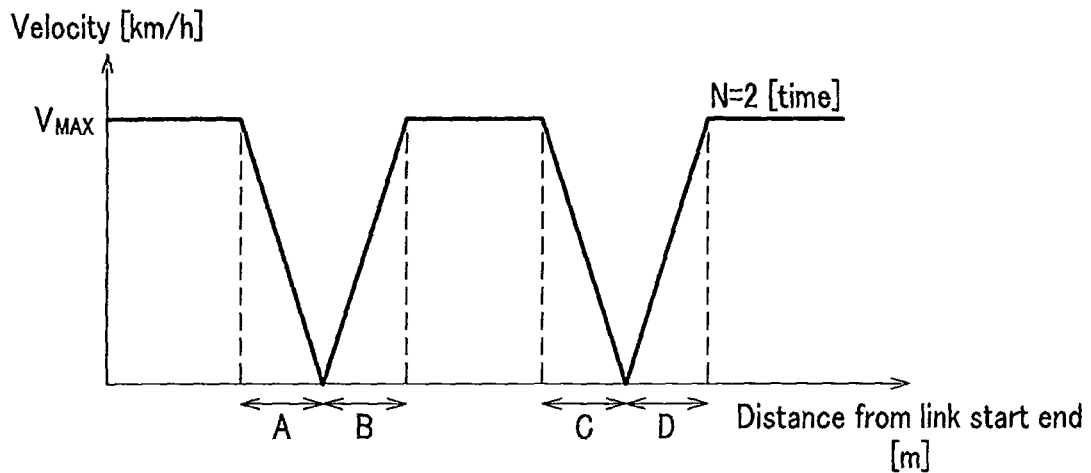
FIG. 6 is a diagram of the concept of estimating a driving pattern in the first embodiment.

FIG. 6 is a diagram of the concept of estimating a driving pattern in the first embodiment. FIG. 7 is a flowchart showing a procedure of driving pattern analysis processing in the first embodiment.

In the driving pattern analysis processing, the geographic characteristic value calculation section 101 analyzes driving patterns in each link from probe data and information (link information) in the road map. A driving pattern referred to herein is a pattern of the velocity and acceleration/deceleration of a vehicle in a link. Incidentally, the driving pattern analysis processing is performed on the probe data read in step S104.

First, the driving pattern analysis processing in the present embodiment will be briefly described.

The present embodiment is aimed at extracting effects only of the geography (geographic characteristic values) by removing effects of driving patterns and vehicle types from data on energy consumption ([J]) converted from electric power consumption ([Wh]) or fuel consumption ([cc]) collected from probe vehicles 2. Therefore, it is necessary that the geographic characteristic value calculation section 101 analyzes driving patterns and calculates effects on energy consumption. However, if probe data (probe DB) is in a format as shown in FIG. 2, the probe data includes only data on the date and time of passage, a travel time, and energy consumption of the vehicle (probe vehicle 2) at links, and accordingly, it is not possible to calculate data other than the average driving velocity directly from the probe data. In this situation, using the probe data and information (link information) in the road map, the geographic characteristic value calculation section 101 can estimate the status of acceleration/deceleration of a vehicle in a link and thereby calculate effects of a driving pattern on the energy consumption.

Incidentally, another possible example is that probe data include detailed information such as temporal change in velocity instead of the format as shown in FIG. 2. Even in such a case, by using only data on the average velocity and estimating the driving pattern, as in the present embodiment, an advantage can be obtained that the communication load between probe vehicles 2 and the navigation server 1 and the processing load required for analysis are significantly reduced.

In the present embodiment, the driving pattern of each probe vehicle 2 in a link is expressed by indexing with the average velocity $V_{AVE}$, the degree of congestion J, the maximum velocity $V_{MAX}$ [m/s], the number of times N of acceleration/deceleration [time], and the acceleration/deceleration probability $P_{ACC}$.

While describing the concept of estimation of a driving pattern in the present embodiment with reference to FIG. 6, the procedure of the driving pattern analysis processing in the first embodiment will be described with reference to FIG. 7.

The velocity varies in many ways through the driving of a real vehicle, however, in the present embodiment, the driving is expressed in a simple manner by using a constant velocity drive at the maximum velocity $V_{MAX}$ and an acceleration/deceleration drive at a constant acceleration/deceleration G [m/s2].

First, the geographic characteristic value calculation section 101 calculates an average velocity $V_{AVE}$ as $V_{AVE}=L/T$ from the travel time T of a probe vehicle 2 and a link length L obtained from the road map (link information) (S201).

Next, the geographic characteristic value calculation section 101 calculates the degree of congestion J from the calculated average velocity $V_{AVE}$ (S202). The degree of congestion J is determined for each velocity region. For example, for an open road, the degree of congestion is determined such that J=1 when $V_{AVE}$ (30 km, J=2 when 30 km/h ($V_{AVE}$ (10 km/h, and J=3 when 10 km/h ($V_{AVE}$. Likewise, for a highway, the degree of congestion J is determined such that J=1 when $V_{AVE}$ (60 km, J=2 when 60 km/h ($V_{AVE}$ (40 km/h, and J=3 when 40 km/h ($V_{AVE}$. That is, in the present embodiment, the degree of congestion J is determined from the average velocity. This is because the average velocity in a link is estimated to be high when congestion is not present, and the average velocity in the link is estimated to be low when congestion is present.

Then, the geographic characteristic value calculation section 101 calculates the maximum velocity $V_{MAX}$ of a vehicle in the link from the degree of congestion J, and the road class and the limit speed included in the link information (S203). For example, for an open road, when J (degree of congestion)=1, $V_{MAX}$ is set to the limit speed of the link. When J=2, $V_{MAX}$ is set to the value of the upper limit, $V_{MAX}$=30 km/h, in the velocity region used in calculating the degree of congestion J. Likewise, when J=3, $V_{MAX}$ is set as $V_{MAX}$=10 km/h. Likewise, for a highway, when J=1, $V_{MAX}$ is set to the limit speed. When J=2, $V_{MAX}$ is set as $V_{MAX}$=60 km/h. When J=3, $V_{MAX}$ is set as $V_{MAX}$=40 km/h.

Subsequently, the geographic characteristic value calculation section 101 calculates the number of times of acceleration/deceleration N from $N=T/T_C$ (S204). In this expression, T is the link travel time, and $T_C$ is a constant defined by the road class. Incidentally, on an open road, effects of traffic signals and the like are significant, and therefore, acceleration and deceleration occur more often compared with a highway. Therefore, representing $T_C$ for an open road by $T_{CA}$ and representing $T_C$ for a highway by $T_{CB}$, the constants $T_{CA}$ and $T_{CB}$ may be set to be $T_{CA}<T_{CB}$. That is, in the present embodiment, it is estimated that the longer the travel time T, the larger the number of times of acceleration and deceleration, while the shorter the travel time T, the smaller the number of times of acceleration and deceleration.

Next, the geographic characteristic value calculation section 101 uses $V_{MAX}$ and N having been calculated, and thereby calculates the acceleration/deceleration probability $P_{ACC}$ from the amplitude G of acceleration/deceleration and the link length L (S205). Incidentally, G is given as a parameter of a model, and can be set, for example, by calculating the average acceleration/deceleration from probe data. Further, the acceleration/deceleration probability referred to herein represents the ratio between the link length L and the distance taken for acceleration or deceleration. In the example shown in FIG. 6 (N=2, horizontal axis represents the distance from the start end of the link, and vertical axis represents velocity), calculation can be performed such that (acceleration probability)=(B+D)/L, and (deceleration probability)=(A+C)/L. As shown in FIG. 6, A and C are distances taken for acceleration, and B and D are distances taken for deceleration. In general, it is understood that the acceleration probability and the deceleration probability are different, however, if it is simplified such that the amplitude G of acceleration and the amplitude G of deceleration are equal to each other, $L_{ACC}$ (distance taken for acceleration and deceleration)= A=B=C=D, making the acceleration probability and the deceleration probability equal to each other, and accordingly, the acceleration probability and the deceleration probability are commonly represented by acceleration/deceleration probability $P_{ACC}$. Herein, as calculation can be performed such that $L_{ACC}=V_{MAX}^2/2G$, by using $L_{ACC}$ calculated here and N calculated in step S204, the acceleration/deceleration probability can be calculated as $P_{ACC}=N \cdot L_{ACC}/L$.

In such a manner, the driving pattern analysis processing to index a driving pattern in a link from probe data is completed. In the present embodiment, the degree of congestion, the maximum velocity, the number of times of acceleration and deceleration, the acceleration/deceleration probability, and the like are simplified, thus enabling reduction in the processing load. Of course, when measured values for these values are present, they may be used.

Geographic Characteristic Value Calculation Processing

Next, geographic characteristic value calculation processing corresponding to step S109 in FIG. 5 will be described. The geographic characteristic value calculation processing uses the respective indexes of the driving pattern calculated through the driving pattern analysis processing in FIG. 7 and data of the vehicle parameter DB 133 to remove effects of the driving pattern and the vehicle type from the energy consumption in the probe data, and thereby calculates geographic characteristic values that are characteristic values for which effects only of the geography on the energy consumption are extracted.

Prior to description of the geographic characteristic value calculation processing, an energy consumption model of a vehicle and definition of a geographic characteristic value will be described below.

Energy consumption of a vehicle can be roughly broken down into a part converted into mechanical energy necessary for driving the vehicle and a part that is not converted into mechanical energy necessary for the driving of the vehicle. Herein, referring to the former as driving consumption and referring to the latter as basic consumption, the following Expression (1) represents the relationship between them.

(energy consumption of vehicle)=((driving consumption)/η+(basic consumption))/e  (1)

Symbol 'e' in Expression (1) represents the conversion efficiency from energy consumption of a vehicle such as consumption of power accumulated in a battery or consumption of fuel into the energy such as basic consumption and driving consumption actually used for driving the vehicle. In the present embodiment, this is referred to as energy conversion efficiency and stored in the vehicle parameter DB 133.

First, discussing the driving consumption, consumption affected by geography, consumption due to air resistance, consumption due to acceleration/deceleration, and the like can be cited as factors in the driving consumption. However, air resistance is of a small value except during driving at a high velocity, and therefore, air resistance is not included in calculation in the present embodiment. Of course, the driving consumption may be calculated, taking air resistance into account.

Herein, the consumption affected by geography includes consumption due to the variation in potential energy because of undulation in a link, and consumption due to friction affected by the material of the road and the like. Further, in a case of electric vehicles and the like, the effect of regeneration from the potential energy due to undulation in a link can be a factor. Further, friction can be considered common to all types of vehicles, presuming that friction is affected little by the difference in the vehicle type. In this case, consumption affected by geography is proportional to the vehicle weight W.

Energy consumption of a vehicle due to driving, such as consumption of electric energy accumulated in a battery and consumption of fuel, occurs only when the total of the above-described factors is a positive value, and when the total is a negative value, other energy consumption is not necessary for a change in mechanical energy. Otherwise, in a case of an electric vehicle, if the total of the above-described factors is a negative value because of a downward slope or deceleration, it can also be considered that surplus energy is regenerated. In such a manner, depending on whether the total of the factors is a positive value or a negative value, the energy consumption changes, and accordingly, effects of the geography change also with effects of the driving pattern.

In this situation, in the present embodiment, using the result of calculation of the acceleration/deceleration probability $P_{ACC}$ in a link through the driving pattern analysis processing (FIG. 7), the portion U of consumption due to undulation and friction among effects by the geography is represented by the following Expression (2) with the effect $M_{ACC}$ during acceleration, the effect $M_{CONST}$ at a constant velocity, and the effect $M_{DEC}$ during deceleration (W representing the vehicle weight).

$$U = W \cdot (M_{ACC} \cdot P_{ACC} + M_{CONST} \cdot (1 - 2 \cdot P_{ACC}) + M_{DEC} \cdot P_{ACC}) \quad (2)$$

Further, among the effects of the geography, the portion Ua due to regeneration is likewise represented by the following Expression (3) using the regeneration efficiency $\epsilon$, with the effect $K_{ACC}$ during acceleration, the effect $K_{CONST}$ at a constant velocity, and the effect $K_{DEC}$ during deceleration.

$$Ua = \epsilon W \cdot (K_{ACC} \cdot P_{ACC} + K_{CONST} \cdot (1 - 2 \cdot P_{ACC}) + K_{DEC} \cdot P_{ACC}) \quad (3)$$

Using the above, the entirety of the effects of the geography is represented by U+Ua, wherein $M_{ACC}$, $M_{CONST}$, $M_{DEC}$, $K_{ACC}$, $K_{CONST}$, and $K_{DEC}$ are amounts unique to a link and independent from a specific driving pattern and vehicle parameters. In the present embodiment, geographic characteristic values are defined as these values ($M_{ACC}$, $M_{CONST}$, $M_{DEC}$, $K_{ACC}$, $K_{CONST}$, and $K_{DEC}$).

Further, regarding other components in driving consumption, the consumption $E_{ACC}$ due to acceleration/deceleration can be calculated by the following Expression (4) from $V_{MAX}$ and N obtained through the driving pattern analysis processing (FIG. 7), and the vehicle weight W and the regeneration efficiency $\epsilon$ of the vehicle parameters.

$$E_{ACC} = (1 - \epsilon) N \cdot W \cdot V_{MAX}^2 / 2 \quad (4)$$

Next, the basic consumption will be described. Regarding factors in the basic consumption, in a case of a vehicle mounting an internal combustion engine, consumption due to the inner resistance of the internal combustion engine is considered to be a factor, and further, as factors common to internal combustion engine vehicles and electric vehicles, consumption by an air conditioner, consumption by headlights, consumption by wipers, consumption by other electric/electronic devices, and other consumptions can be cited.

Herein, discussing the relationship between the respective components of the basic consumption and the geography or driving pattern, the consumption due to the internal resistance of an internal combustion engine is for maintaining the rotation of the internal combustion engine, and this consumption occurs also during idling. Accordingly, the amount of this consumption is proportional to the driving time, and can be considered to have little interrelationship with the velocity or acceleration/deceleration. Further, although the consumption of an air conditioner, a wiper or electric/electronic devices occurs at ON/OFF of operation, this consumption has nothing to do with the velocity nor the acceleration/deceleration and can be considered to be proportional to time when averaged.

From the above, it is understood that the basic consumption is a factor proportional to time, wherein the basic consumption $E_{BASE}$ [J] in a target link for processing can be simplified by the following Expression (5), representing the proportionality coefficient by F [J/sec] and the travel time by T [sec].

$$E_{BASE} = F \cdot T \quad (5)$$

Incidentally, the proportionality coefficient F can be calculated by measuring in advance the energy consumption per unit time in a state that a target vehicle is not driving. Further, this proportionality coefficient F is referred to as basic consumption coefficient and is stored in the vehicle parameter DB 133.

Thus, in the present embodiment, reduction in the communication load between probe vehicles 2 and the navigation server 1 and the processing load is attempted by simplifying the basic consumption, however, if actual measurement values of the respective values can be obtained, these actual measurement values may be used.

From the above, as an energy consumption model of a vehicle, an energy consumption model shown in the following Expression (6) can be obtained, representing the energy consumption of a vehicle by Q [J].

$$Q = ((U + Ua + E_{ACC})/\eta + E_{BASE})/e \quad (6)$$

This Expression (6) is a function expressing the energy consumption with the geographic characteristic values, the driving pattern, and the vehicle parameters, and therefore, the energy consumption also can be expressed as the following Expression (7).

$$(\text{energy consumption}) = f((\text{geographic characteristic values}), (\text{driving pattern}), (\text{vehicle parameters})) \quad (7)$$

Figure 7:
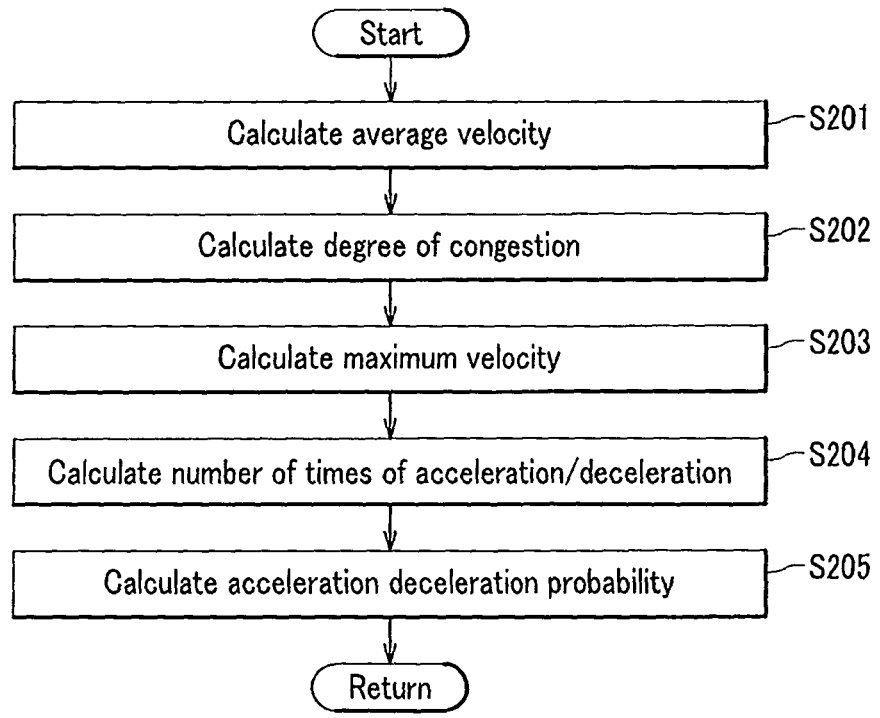
FIG. 7 is a flowchart showing a procedure of processing to analyze a driving pattern in the first embodiment.

The energy consumption and the link travel time can be obtained from probe data; the driving pattern (concretely, the acceleration/deceleration probability $P_{ACC}$) can be obtained by the processing in FIG. 7; and data on vehicle parameters can be obtained from the vehicle parameter DB 133 in plural sets for respective probe vehicles 2. Accordingly, these values are substituted into Expressions (2) to (6). By solving the Expression (6) with substituted values, for the geographic characteristic values ($M_{ACC}$, $M_{CONST}$, $M_{DEC}$, $K_{ACC}$, $K_{CONST}$, $K_{DEC}$), using a method of simultaneous equations or the like, or by an approximate solution such as the least square method, multi-regression analysis, or the like for the respective geographic characteristic values, the respective geographic characteristic values can be calculated.

Based on the above-described definitions of the vehicle energy consumption model and the geographic characteristic values, the processing procedure of the geographic characteristic value calculation processing (corresponding to step S109 in FIG. 5) will be described below.

Figure 8:
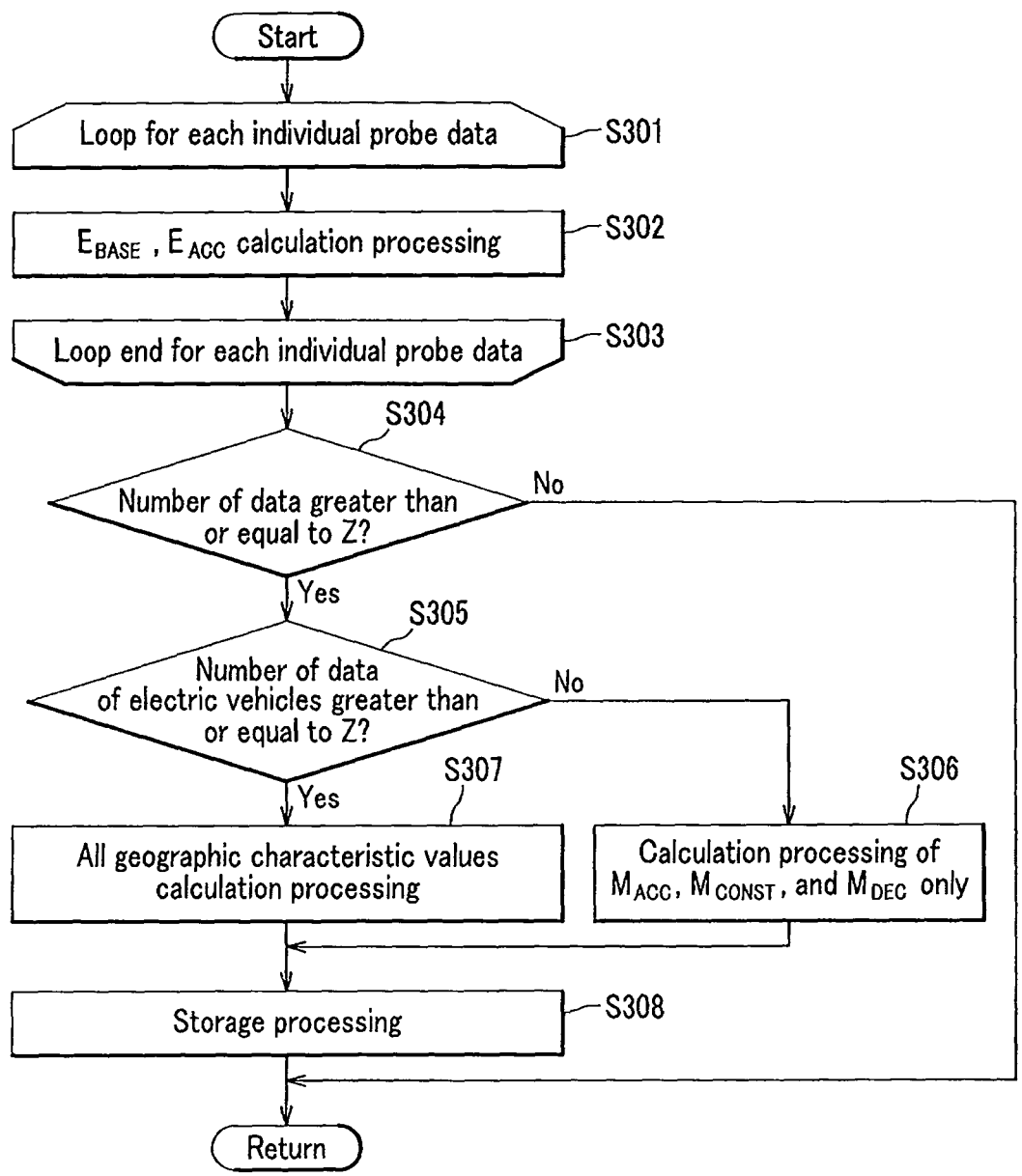
FIG. 8 is a flowchart showing a procedure of processing to calculate geographic characteristic values in the first embodiment.

FIG. 8 is a flowchart showing a procedure of processing to calculate geographic characteristic values in the first embodiment.

First, the geographic characteristic value calculation section 101 loops the processing in step S302 for each of all individual probe data having been read in step S104 in FIG. 5 (S301).

The geographic characteristic value calculation section 101 performs processing to calculate the basic consumption $E_{BASE}$ being the energy consumption by the internal resistance and mounted devices of a vehicle and the driving consumption $E_{ACC}$ being the energy consumption contributing to the variation in the mechanical energy of the vehicle (S302). The basic consumption $E_{BASE}$ can be calculated, as shown by Expression (5), if the link travel time is known. Further, the driving consumption $E_{ACC}$ can be calculated by subtracting the basic consumption $E_{BASE}$ from the energy consumption transmitted from the probe vehicle 2.

When the processing in step S302 is completed for all the individual probe data (S303), the geographic characteristic value calculation section 101 determines whether or not the number of probe data (the number of data) having been used is larger than or equal to Z that is set in advance (S304).

In obtaining the geographic characteristic values, by making Expression (6) true to all the probe data by the use of the result of calculation of the basic consumption $E_{BASE}$ and the driving consumption $E_{ACC}$, the result of driving pattern analysis processing and the obtained result of vehicle parameters, and simultaneously applying Expressions (6) with respect to the respective geographic characteristic values or using the least square method or the like, solutions (geographic characteristic values) are obtained. In the present embodiment, as there are six geographic characteristic values, in a case of calculating the geographic characteristic values by the use of simultaneous equations, the simultaneous equations can be solved if six probe data are available (in other words, if there are six Expressions (6)). However, it is possible that real probe data include errors due to various factors, and therefore, performing calculation only with a few data is not desirable in terms of the reliability of a result. In this situation, in step S304, it is confirmed whether probe data more than or equal to a predetermined number Z are present, and if data fewer than the number Z are present (S304→No), in other words, if too few data are present, then the geographic characteristic value calculation section 101 terminates the processing in FIG. 8 without performing calculation of the geographic characteristic values and returns to the processing in FIG. 5.

In order to determine the threshold Z which is the reference in step S304, for example, a method may be used which, in a link for which a sufficient number of data have been collected, extracts data in a number of X is extracted at random, a task of generating geographic characteristic values is performed plural times, and the threshold Z of the number X of the data is set which makes the variation in the generated geographic characteristic values sufficiently little.

Herein, it is possible that simultaneous equations are not perfectly true due to errors present in probe data. In this case, most probable values can be determined as the geographic characteristic values by using a method, such as the least square method, multi-regression analysis, or the like.

In step S304, if there are data in a number greater than or equal to the number Z in step S304 (S304→Yes), the geographic characteristic value calculation set 101 determines whether or not there are probe data, which are related to electric vehicles, in a number (the number of data) greater than or equal to a number Z that is set in advance (S305). Herein, although the threshold Z in step S305 is set to be the same as the threshold Z in step S304, a different number may be set.

As a result of step S305, if the number of data related to electric vehicles is smaller than Z (S305→No), then calculation processing is performed only for the geographic characteristic values $M_{ACC}$, $M_{CONST}$, and $M_{DEC}$, which are related to internal combustion engine vehicles, out of the geographic characteristic values (S306).

Further, as a result of step S305, if the number of data related to electric vehicles is greater than or equal to Z (S305→Yes), then calculation processing is performed for all the geographic characteristic values (($M_{ACC}$, $M_{CONST}$, $M_{DEC}$, $K_{ACC}$, $K_{CONST}$, and $K_{DEC}$) (S307).

That is, in a case, for example, where only probe data of internal combustion engine vehicles are present, or in a case where probe data related to vehicles, such as electric vehicles, on which regeneration occurs have been insufficiently obtained, the geographic characteristic value calculation section 101 cannot calculate the geographic characteristic values $K_{ACC}$, $K_{CONST}$, and $K_{DEC}$ of electric vehicles related to Expression (3). However, even in such a case, it is possible to calculate only the geographic characteristic values $M_{ACC}$, $M_{CONST}$, and $M_{DEC}$ of internal combustion engine vehicles related to Expression (2). Even only with $M_{ACC}$, $M_{CONST}$, and $M_{DEC}$, it is possible to perform calculation of energy consumption prediction with respect to internal combustion engine vehicles, which attains a sufficient utility value. In this situation, in step S305, the geographic characteristic value calculation section 101 confirms the vehicle types of respective probe data, based on the vehicles of obtained probe data, and if the number of data of electric vehicles and the like is smaller than number Z (a predetermined value), then the calculation processing is performed only for $M_{ACC}$, $M_{CONST}$, and $M_{DEC}$ in step S306, and if greater than number Z, then the calculation processing is performed for all the geographic characteristic values in step S307.

In the calculation processing only for $M_{ACC}$, $M_{CONST}$, and $M_{DEC}$ in step S306 and calculation processing for all the geographic characteristic values in step S307, the geographic characteristic values may be calculated by simultaneous equations, or the most probable geographic characteristic values may be calculated by the least square method, as described above.

After performing the processing in step S306 or step S307 and then the processing to store the respective calculated geographic characteristic values in the geographic characteristic value DB 134 (S308), the geographic characteristic value calculation section 101 returns to the processing in FIG. 5.

Geographic Characteristic Value DB

FIG. 9 is a diagram showing an example of a format of a geographic characteristic value DB in the first embodiment.

In the geographic characteristic value DB 134, the respective geographic characteristic values of $M_{ACC}$, $M_{CONST}$, $M_{DEC}$, $K_{ACC}$, $K_{CONST}$, and $K_{DEC}$ are stored in relation with link numbers and creation dates and times being calculation dates and times of the corresponding geographic characteristic values. Further, as shown in FIG. 9, it is also possible to add the degree of reliability to the geographic characteristic values. The degree of reliability can be, for example, the number of probe data used for creation of the geographic characteristic values.

Through the processing in FIGS. 5, 7, and 8, the geographic characteristic value calculation processing to calculate geographic characteristic values from the actual driving results of the probe vehicles 2 is completed, wherein the geographic characteristic values are values representing the effects of the geographies made on the energy consumption in road links or sections on a road.

Energy Consumption Prediction Processing

Next, a method of predicting energy consumption, the method being performed on the navigation server 1 using the calculated geographic characteristic values, will be described.

FIG. 10 is a diagram showing an example of a format of a request for predicted energy consumption transmitted from the navigation terminal, and FIG. 11 is a flowchart showing a procedure of processing to predict energy consumption in the first embodiment.

Upon receipt of a request for predicted energy consumption by the communication section 141 from the navigation terminal 3 of a target vehicle for service, the energy consumption prediction section 120 operates and performs the following prediction of energy consumption of links, wherein links for which the request for prediction has been made or the links in an area for which the request for prediction has been made are processed as targets links. Herein, the navigation terminal 3 makes the request for predicted energy consumption by transmitting a predicted energy consumption request in a format example as shown in FIG. 10 to the navigation server 1.

As shown in FIG. 10, the predicted energy consumption request includes a set of vehicle type data on vehicles mounting a navigation terminals 3, unit IDs of the navigation terminals 3, and the request-made time being the time the request has been made, as well as a request link number list that is a list of links for which prediction of energy consumption is intended.

As shown in FIG. 11, upon receipt by the communication section 141 of the navigation server 1 of the predicted energy consumption request transmitted from the navigation terminal 3 (S401), the predicted energy consumption calculation section 122 loops the processing in steps S403 to S407 for each of target links for processing, wherein the target links for processing are the links with the link numbers described in the request link number list of the predicted energy consumption request having been received (S402).

The traffic information prediction section 121 of the energy consumption prediction section 120 calculates a predicted link travel time $T_{PRED}$ by, for example, obtaining a travel time, the travel time corresponding to the estimated time of passing a target link, from statistical traffic information created by sorting link travel times in the past by day type and time zone and statistically processing, and then delivers the calculated predicted link travel time $T_{PRED}$ to the predicted energy consumption calculation section 122. Incidentally, for obtaining the estimated time of passing a link, one possible method is performed such that the traffic information prediction section 121 calculates the straight distance from the current position to the link in advance from statistical traffic information, and add a time, the time being obtained by dividing the calculated direct distance by the average vehicle velocity in the area, to the current time.

Then, the predicted energy consumption calculation section 122 performs predicted link travel time obtaining processing to obtain a predicted link travel time of a target link for processing from the traffic information prediction section 121 (S403).

Next, the predicted energy consumption calculation section 122 performs vehicle parameter reading processing to read, corresponding vehicle parameter data from the vehicle parameter DB 133 (S404) by using a key of vehicle type data included in the energy consumption prediction request. Herein, if data such as sensor data on a vehicle mounting a navigation terminal 3, vehicle weight having been input through user input, etc. are included in the predicted energy consumption request, the vehicle parameters included in the predicted energy consumption request may be used instead of the vehicle parameter data.

Then, the energy consumption calculation section 122 performs geographic characteristic value reading processing to read, with a key of the link number of the target link for processing, corresponding respective geographic characteristic values from the geographic characteristic value DB 134 (S405).

Then, the energy consumption calculation section 122 uses the predicted travel time delivered from the traffic information prediction section 121 in step S403, and thereby performs driving pattern prediction processing to predict a driving pattern including the velocity and acceleration/deceleration in the target link for processing (S406). The processing in step S406 is similar to that in FIG. 7 except that a link travel time T obtained from a probe vehicle 2 is replaced by a predicted link travel time $T_{PRED}$, and accordingly detailed description thereof will be omitted. Therefore, similarly to FIG. 7, results of step S406 will be the average velocity $V_{AVE}$, the degree of congestion J, the maximum velocity $V_{MAX}$ [m/s], the number of times N of acceleration/deceleration [time], and the acceleration/deceleration probability $P_{ACC}$.

Next, the energy consumption calculation section 122 substitutes the predicted link travel time and vehicle parameter data obtained in step S403 and step S404, the geographic characteristic values obtained in step S405, and respective values calculated in step S406 into Expressions (2) to (6), and thereby performs predicted energy consumption calculation processing to calculate predicted energy consumption (S407). Herein, the predicted link travel time $T_{PRED}$ is used instead of the link travel time T.

Then, when the loop from step S403 to step S407 for respective target links for processing is completed (S408), the energy consumption calculation section 122 generates predicted energy consumption delivery data, as shown in FIG. 12, performs delivery processing to deliver this predicted energy consumption delivery data to the navigation terminal 3 having transmitted the request for predicted energy consumption (S408), and then terminates the energy consumption prediction processing.

Predicted Energy Consumption Delivery Data

FIG. 12 is a diagram showing an example of a format of predicted energy consumption delivery data in the first embodiment.

As shown in FIG. 12, the format has a prediction result list which includes data in a set of an address unit ID being the ID of the navigator terminal 3 having made the request, link numbers, predicted energy consumptions ([J]), and predicted travel times being the predicted link travel times calculated at the stage in step S403. In such a manner, it is desirable that predicted link travel times and predicted energy consumptions are delivered to the navigation terminal 3.

Route Search Processing

FIG. 13 is a flowchart showing the route search processing in the first embodiment.

The route search section 305 of the navigation terminal 3 performs departure-point/destination/search-start-instruction receipt processing to receive an input of a departure point and a destination and an instruction to start route search via the input section 303 (S501). The departure point may be a position of the vehicle itself obtained via the GPS receiving section 304 instead of a departure point that is input by the user.

Then, the route search section 305 creates a link list of targets for predicting energy consumption (S502). As target links for predicting energy consumption, the route search section 305 extracts links with a high probability of being included in a route between the departure point and the destination, and sets these links as target links for predicting energy consumption. For this extraction, one possible method, for example, is to extract links from the road map, the links being within a certain distance from a line connecting the departure point and the destination.

Then, the route search section 305 generates a predicted energy consumption request (FIG. 10) including the link list of targets for predicting energy consumption created in step S502, and transmits this predicted energy consumption request via the communication section 301 to the navigation server 1 (S503). Incidentally, it is assumed that the vehicle type data included in the prediction energy consumption request is set in advance by the user, the navigator manufacturer, the vehicle manufacturer, or the like.

Then, when the communication section 301 receives predicted energy consumption delivery data (FIG. 12) as a response to the predicted energy consumption request (S504), the route search section 305 performs route search processing to search a route that minimizes the energy consumption between the departure point to the destination, using minimum-cost route search algorithm such as Dijkstra's Algorithm together with information on connection between links in the road map DB 307, with the delivered predicted energy consumptions as the cost of links (S505). The searched minimum energy consumption route is delivered to the route guide section 306.

The route guide section 306 displays route information delivered from the route search section 305 on the output section 302 together with the current position of the vehicle itself obtained from the road map DE 307 and the GPS receiving section 304. Thus, by following a guidance provided by the navigation terminal 3, the driver can drive the vehicle on a route that minimizes the energy consumption.

Example of Route Display

Figure 14:
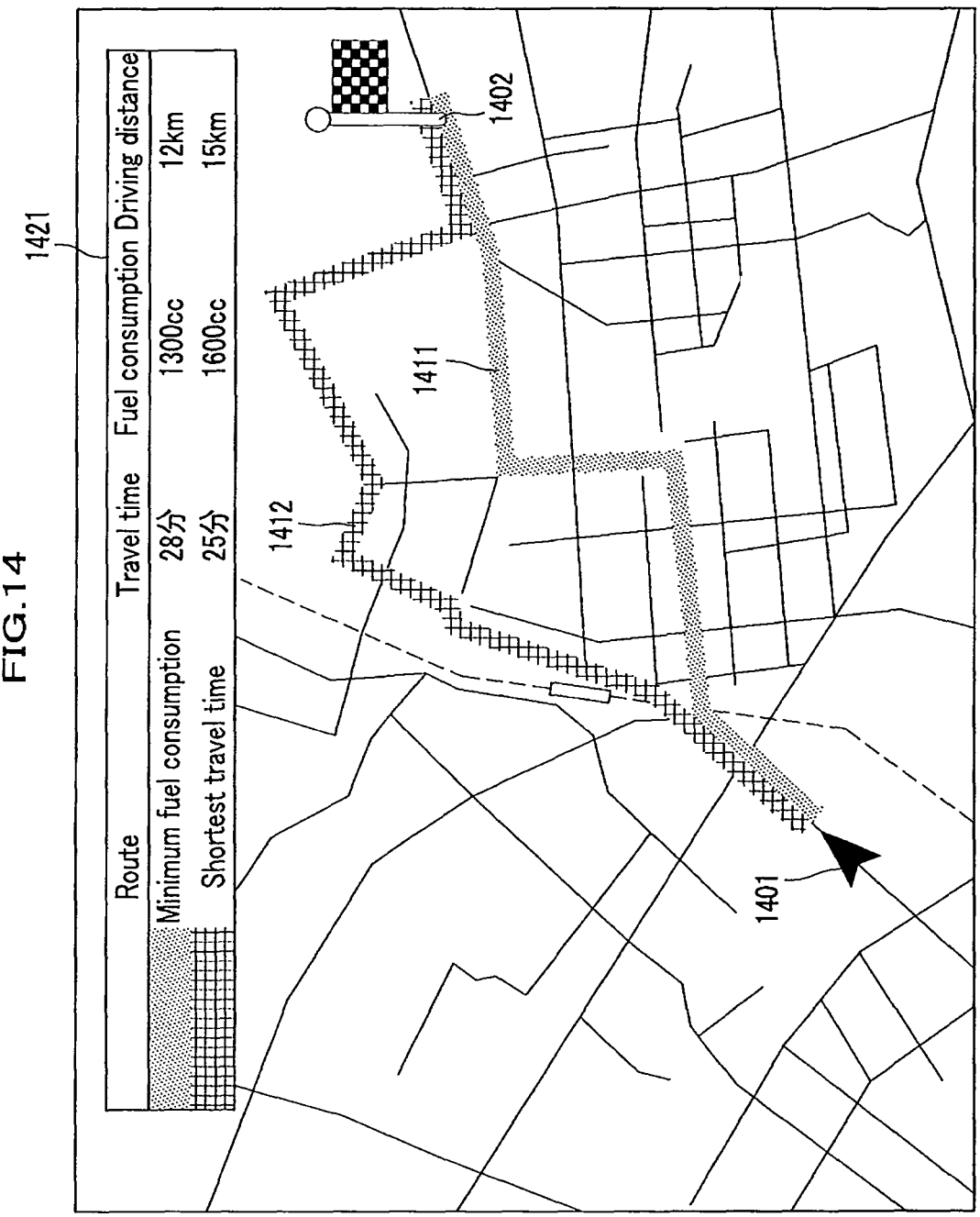
FIG. 14 is a diagram showing an example of route displaying (route display example 1) in the first embodiment.
Figure 15:
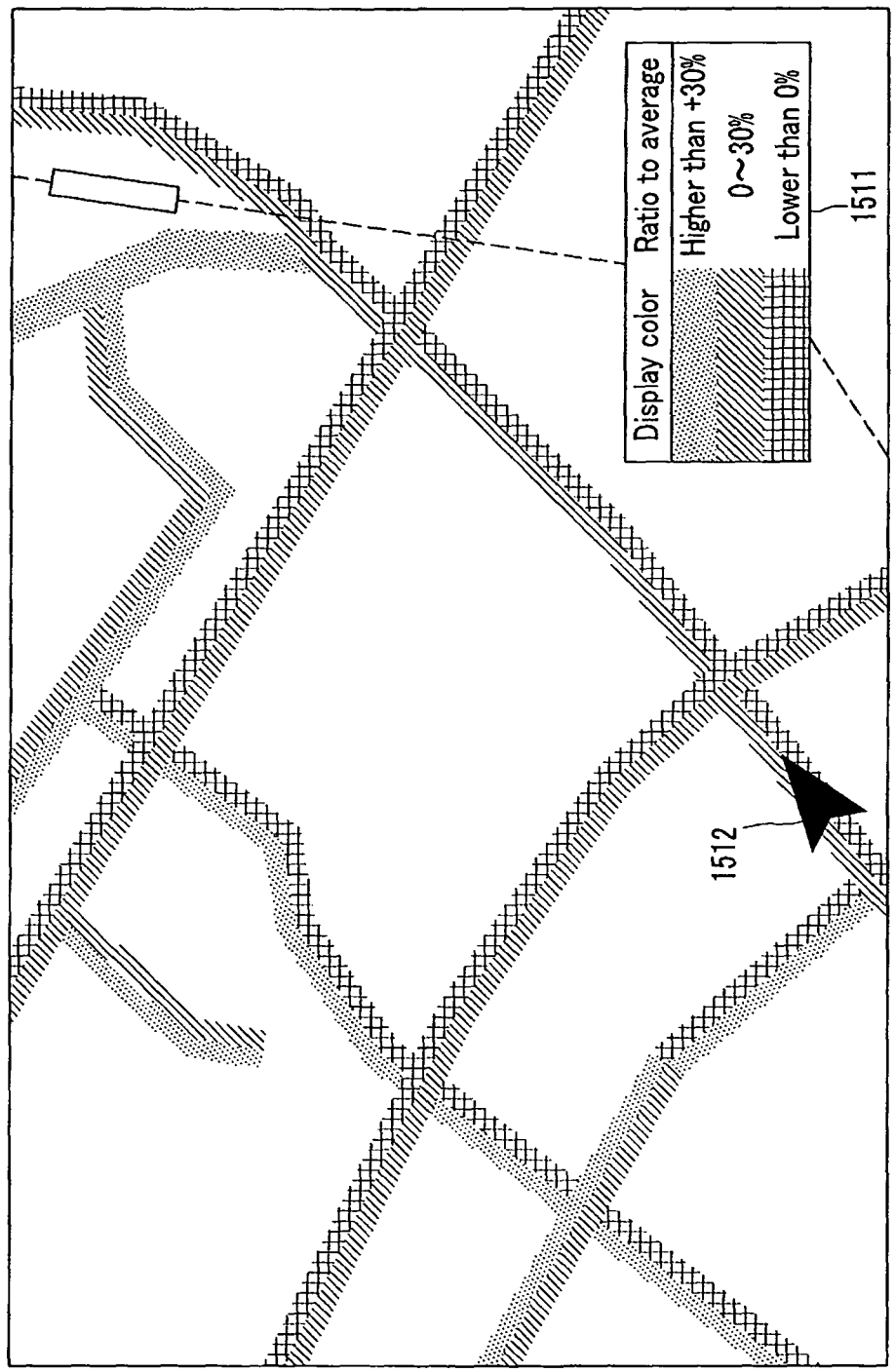
FIG. 15 is a diagram showing an example of route displaying (route display example 2)

FIGS. 14 and 15 are diagrams showing an example of displaying routes in the first embodiment.

In the example shown in FIG. 14, the route guide section 306 converts the energy consumptions into fuel consumptions, and displays both the minimum energy consumption route and the shortest travel time route in comparison on the output section 302. In the figure, a reference numeral 1401 represents a mark showing the position of the vehicle itself and the driving direction. A reference numeral 1402 represents the destination. A route 1411 is the minimum energy consumption route, while the route 1412 shows the shortest travel time route. Further, a reference numeral 1421 represents the respective predicted values of the travel times, the fuel consumptions, and the drive distances of the routes 1411 and 1412. FIG. 14 shows a comparison between the minimum energy consumption route and the shortest travel time route, however, FIG. 14 may be made capable of displaying any one of the shortest distance route, the minimum energy consumption route, and the shortest travel time route, or simultaneously displaying all of the three routes to enable comparison.

As such information being displayed, it is possible to select, and drive a vehicle on a route that meets the preference of an individual driver, such as reduction in the energy consumption, reduction in the travel time, or reduction in the drive distance. Further, by selecting on this screen either the route 1411 or the route 1412, or selecting any one of the results of routes indicated by the reference numeral 1421 via a touch panel or the like, the display may be changed to display only one of the routes, or a route guidance may be started with respect to the selected route, such as presenting points to make a left or right turn, by screen display or audio.

Further, the route guide section 306 may display the predicted energy consumptions received from the navigation server 1, not only for the routes displayed on the output section 302, but also for roads other than these routes, in different colors depending on the amount of energy consumption. As a method of using different colors, one possible method is, for example, to use a green color for links of a lower energy consumption (average ratio lower than 0%) than the average energy consumption of vehicles (the average energy consumption), a yellow color for links with energy consumption higher than the average energy consumption by 0% to 30% (average ratio of 0 to 30%), and a red color for links with even higher energy consumption (average ratio of higher than +30%). Herein, energy consumption includes both predicted energy consumption and energy consumption included in probe data. The average ratio refers to the ratio of difference (a−b) calculated from energy consumption (a) and average energy consumption (b), to the average energy consumption (b). That is, the average ratio is (a−b)/b.

FIG. 15 shows an example of displaying energy. In this example, the routes on the screen are displayed in the three levels of high energy consumption (with an average ratio higher than +30%), moderate energy consumption (with an average ratio of 0-30%), and low energy consumption (with an average ratio lower than 0%), and an example is shown by the reference numeral 1511. Incidentally, reference numeral 1512 represents a mark showing the position of the vehicle itself.

Regarding another method of displaying, by displaying only links with high predicted energy consumption, a driver can easily avoid driving such links, or by displaying only links with low predicted energy consumption, the driver can easily drive a vehicle, actively selecting such links.

As has been described above, it is possible to realize a method of predicting energy consumption and a navigation system that enable the navigation terminals 3 of service target vehicles to make use of energy consumptions predicted based on actual driving results of probe vehicles 2.

Summary of First Embodiment

According to the first embodiment, because calculation of predicted energy consumption is performed by the navigation server 1, it is not necessary to perform processing to predict energy consumption by a navigation terminal 3. Therefore, it is not necessary to hold the geographic characteristic value DB 134 or the vehicle parameter DB 113 in the navigation terminal 3, which enables saving the storage area of a HDD (Hard Disk Drive), a flash memory, and the like in a navigation terminal 3. Further, since the processing performance of the navigation server 1 is considered, in general, to be higher than that of a navigation terminal 3, there is also an advantage of reduction in processing time and reduction in the cost of the CPU of the navigation terminal 3.

Further, herein, as predicted energy delivery data delivered from the navigation server 1 also includes predicted travel times, the route search section 305 can search a route with the shortest travel time, with the predicted travel time as the cost of a link. Still further, using not only the shortest travel time route but also information on the lengths of links in the road map DB 307, it is also possible to search the shortest distance route. When all of these are carried out, a driver can make a selection, comparing the minimum energy consumption route and the shortest travel time route by a screen display and the like.

Still further, by adding energy consumptions or travel times of a searched route, the predicted energy consumption or the predicted travel time of the route can be displayed. Presenting the result to the driver with a screen display or the like has an effect of enabling the driver to easily select a route. Further, herein, it is also possible to convert the energy consumption into power consumption or fuel consumption and display the power consumption or fuel consumption instead of displaying the energy consumption as it is. This can be realized by setting, in advance on a navigation terminal 3, the conversion coefficient from a power accumulated in a battery into energy or a conversion coefficient from fuel into energy. A conversion coefficient can be obtained by comparison in advance between a result of driving on a vehicle table or a test course that allows measuring energy consumption and the power or fuel consumption then.

A possible method of reflecting actual driving results of probe vehicles 2 to prediction of energy consumption other than the method in the present embodiment is to sort probe data of the actual driving results by individual conditions such as vehicle type and driving pattern, and create statistics for the respective sorting categories. However, with this method, it cannot be avoided that the number of probe data usable for creation of statistics for one sorting category is fewer compared with the original number of data.

In contrast, in the present embodiment, because of processing to convert probe data of the probe vehicles 2 into geographic characteristic values independent from the driving pattern and vehicle type, all the probe data can be used for generation of geographic characteristic values regardless of the driving pattern or vehicle type of the probe vehicles 2. Accordingly, compared with a case of creating statistics for the respective sorting categories, the reliability of created data in the present embodiment is higher, and further, even from fewer probe vehicles 2 (probe data in a number of three at least are enough), prediction reflecting actual driving results with a short data collection period can be realized.

Yet further, in a case of creating statistics for the respective sorting categories, it is not possible to make a prediction with respect to a sorting category in which data has not been obtained even once. However, in the present embodiment, because the geographic characteristic values do not depend on the vehicle type or the driving pattern, it is possible to predict energy consumption even in an area corresponding to a sorting category in which probe data has not been obtained, by using vehicle parameters and driving pattern prediction corresponding to the sorting category.

Second Embodiment

Next, a second embodiment in accordance with the invention will be described, referring to FIGS. 16 to 20. While the navigation server 1 calculates predicted energy consumption in the first embodiment, in the second embodiment, a navigation terminal 3a obtains geographic characteristic values calculated by a navigation server 1a, and the navigation terminal 3a calculates predicted energy consumption, using the obtained geographic characteristic values.

System Configuration

Figure 16:
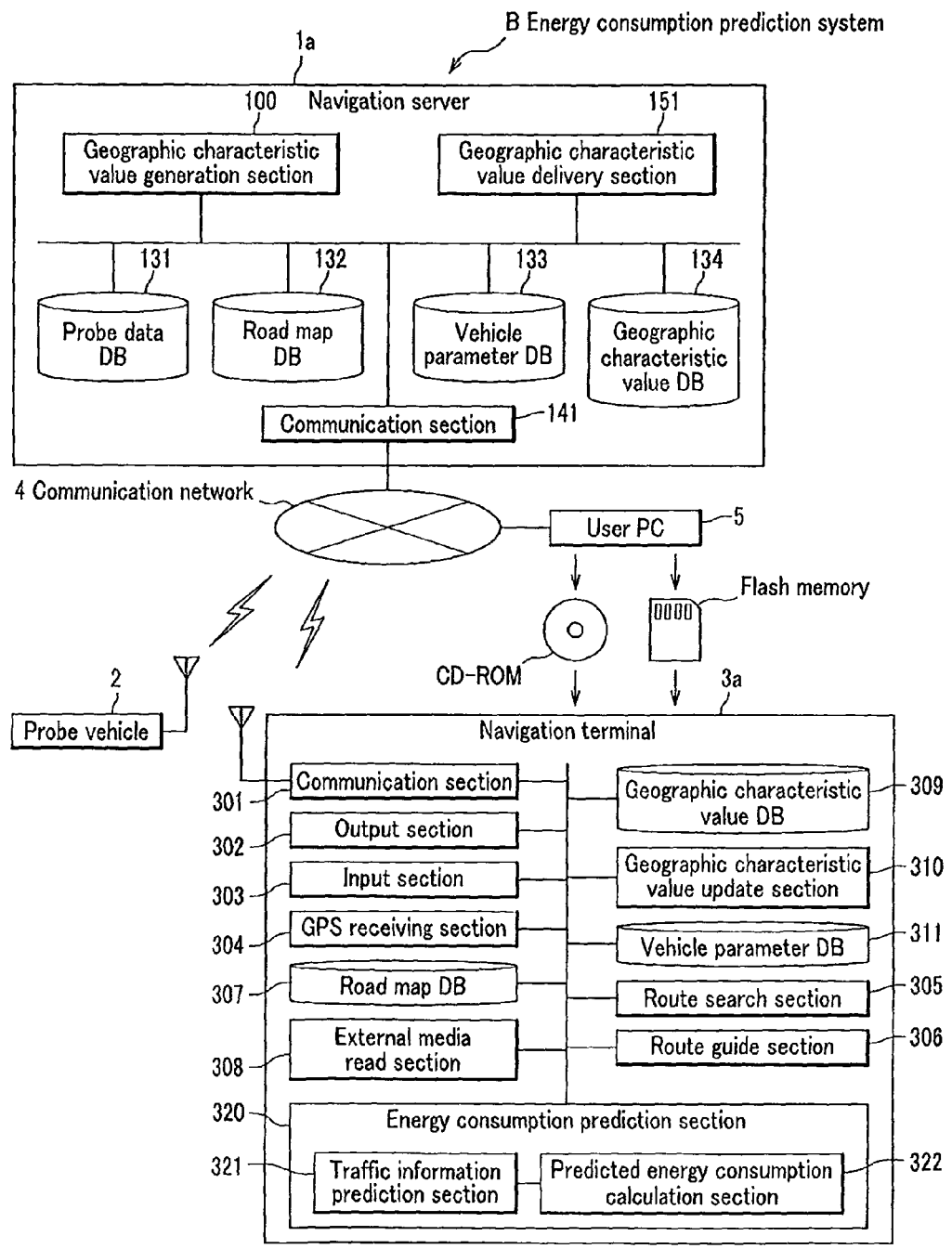
FIG. 16 is a diagram showing an example of the configuration of a system for predicting energy consumption in a second embodiment.

FIG. 16 is a diagram showing an example of the configuration of a system for predicting energy consumption in the second embodiment.

An energy consumption prediction system B includes probe vehicles 2, a navigation server 1a, and navigation terminals 3a. Further, the energy consumption prediction system B may include user PCs (Personal Computer) 5 connected with the navigation server 1a via a communication network 4.

The probe vehicles 2 are similar to the probe vehicles 2 in the first embodiment, and therefore, detailed illustration and description thereof will be omitted.

The navigation server 1a includes a communication section 141, a probe data DB 131, a road map DB 132, a vehicle parameter DB 133, a geographic characteristic value DB 134, a geographic characteristic generation section 100, and a geographic characteristic value delivery section 151.

In the navigation server 1a, the communication section 141, the probe data DB 131, the road map DB 132, the vehicle parameter DB 133, the geographic characteristic generation section 100, and the geographic characteristic value DB 134 are similar to the respective sections shown in FIG. 1, and therefore, the same reference numerals will be given and description will be omitted.

The geographic characteristic value delivery section 151 has a function, upon receipt of a request for delivering geographic characteristic values, the request being received from a later-described geographic characteristic value update section 310 of the navigation terminal 3a, to deliver geographic characteristic values of links on which the request has been made. Alternatively, upon receipt of a request for delivering geographic characteristic values, the request being received from the navigation terminal 3a, the geographic characteristic value delivery section 151 updates a geographic characteristic value DB 309 in the navigation terminal 3a, by having the communication section 141 of the navigation server 1a deliver geographic characteristic values to the user PC 5 and having the navigation terminal 3a read the delivered geographic characteristic values via a medium such as a CD-ROM (Compact Disk-Read Only Memory), a flash memory, or the like.

The navigation terminal 3a includes a communication section 301, an output section 302, an input section 303, a GPS receiving section 304, a road map DB 307, an external media reading section 308, a geographic characteristic value DB 309, a geographic characteristic value update section 310, a vehicle parameter DB 311, an energy consumption prediction section 320, a route search section 305, and a route guide section 306.

Among these respective sections 301 to 311, the communication section 301, the output section 302, the input section 303, the GPS receiving section 304, the road map DB 307, the route search section 305, and the route guide section 306 are similar to those shown in FIG. 1, and accordingly the same reference numerals are given and the description will be omitted.

Further, the geographic characteristic value DB 309 and the vehicle parameter DB 311 are similar to the geographic characteristic value DB 134 and the vehicle parameter DB 133 provided on the navigation server 1 in the first embodiment.

The external media reading section 308 is capable of reading from media such as a CD-ROM and flash memory.

The geographic characteristic value update section 310 has a function, upon receipt of an update instruction from the user or in updating the data of the geographic characteristic value DB 309 periodically, to transmit an update request for updating the data of the geographic characteristic value DB 309 to the navigation server 1a via the communication section 301. Further, the geographic characteristic value update section 310 has also a function to store geographic characteristic values having received from the navigation server 1a in the geographic characteristic value DB 309 and update the geographic characteristic value DB 309.

The energy consumption prediction section 320 (including a traffic information prediction section 321 and a predicted energy consumption calculation section 322) has the same functions implemented on the navigation terminal 3, as those of the respective corresponding sections 120 to 122 implemented on the navigation server 1 in FIG. 1.

That is, the traffic information prediction section 321 has a function to generate the predicted travel times $T_{PRED}$ of respective links, with statistical traffic information stored in advance in the navigation terminal 3 as the data source.

The predicted energy consumption calculation section 322 has a function to calculate the predicted energy consumptions of the respective road links, using the geographic characteristic values from the geographic characteristic value DB 309, the predicted travel times from the traffic information prediction section 321, and the vehicle parameter data from the vehicle parameter DB 311 and based on a request from the later-described route search section 305, and by calculation similar to that in the predicted energy consumption calculation section 122 on the navigation server 1 in the first embodiment as shown in FIG. 11.

Geographic Characteristic Value Update Processing

Figure 18:
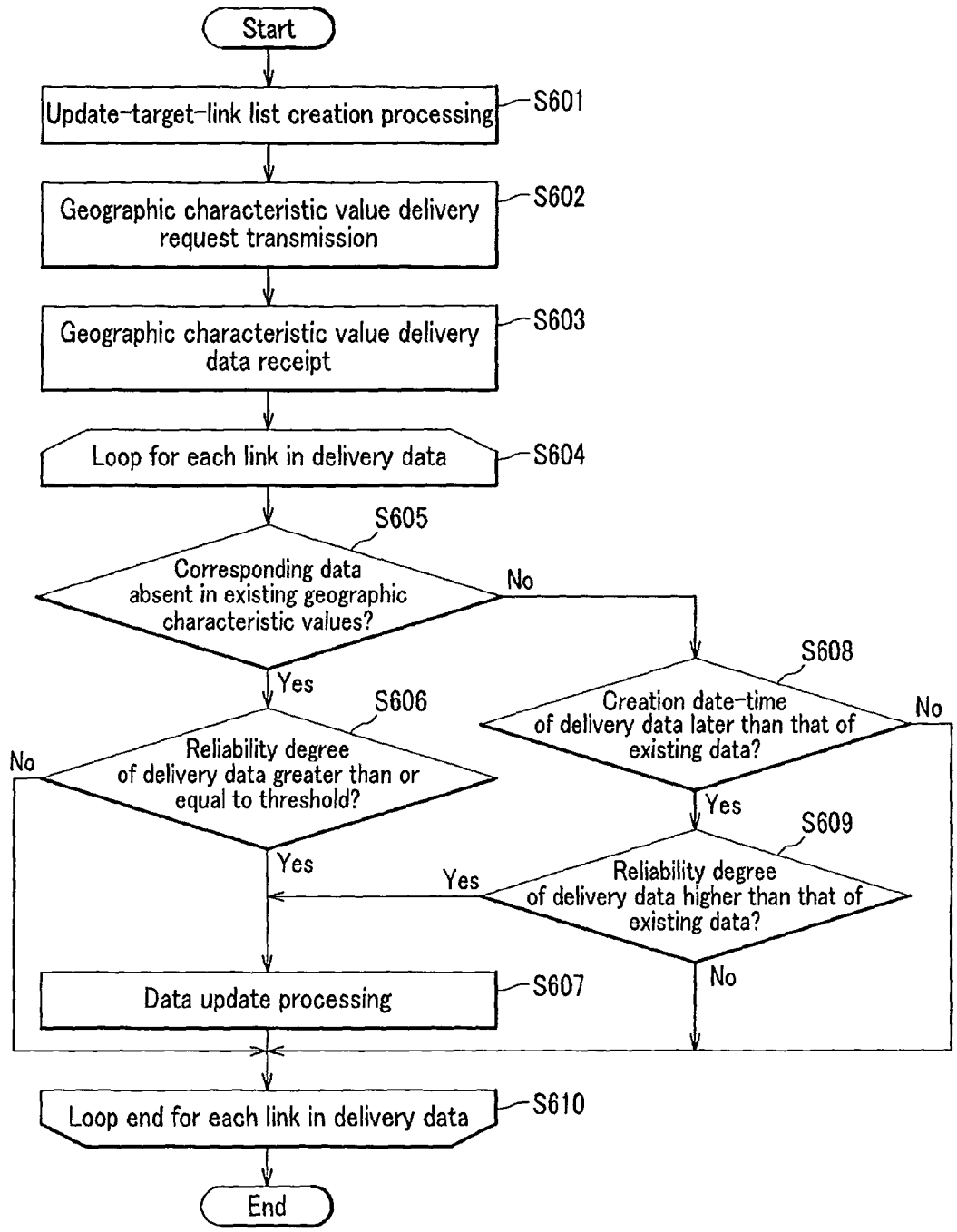
FIG. 18 is a flowchart showing a procedure of processing to update geographic characteristic values in the second embodiment.

FIG. 17 is a diagram showing an example of a format of a request for delivery of geographic characteristic values in the second embodiment, and FIG. 18 is a flowchart showing a procedure of processing to update geographic characteristic values in the second embodiment.

The processing in FIG. 18 is performed on the navigation terminal 3a. Incidentally, the processing in FIG. 19 is performed with assumption that the calculation (FIGS. 5, 7 and 8) of geographic values have been completed on the navigation server 1a.

First, the geographic characteristic value update section 310 of the navigation terminal 3a performs processing to create a link list of targets for updating (S601). The link list of targets for updating is created such that the geographic characteristic value update section 310 extracts links without data of geographic characteristic values, links with low reliability of geographic characteristic values, links of old data creation date and time of geographic characteristic values, and the like from the geographic characteristic value DB 309, and forms the list of the link numbers of the extracted links. The thresholds of the reliability and the creation date and time are assumed to be set by the user in advance.

Then, the geographic characteristic value update section 310 transmits a request for delivery of geographic characteristic values, to the navigation server 1a via the communication section 301 (S602).

As shown in FIG. 17, the request for delivery of geographic characteristic values includes a unit ID for identification of the navigation terminal 3a itself and the link list of targets for updating created in step S601.

The geographic characteristic value delivery section 151, of the navigation server 1a, having received via the communication section 141 the request for delivery of geographic characteristic values obtains corresponding geographic characteristic values from the geographic characteristic value DB 134 in the navigation server 1a, with link numbers described in the list of target links for updating as keys, creates geographic characteristic value delivery data, and then delivers the geographic characteristic value delivery data to the navigation terminal 3a or the user's PC 5 via the communication section 141.

FIG. 19 is a diagram showing an example of a format of geographic characteristic value delivery data in the second embodiment.

The geographic characteristic value delivery data has almost the same format as that of the geographic characteristic value DB 134, shown in FIG. 9, and accordingly, description will be omitted. Incidentally, the destination unit ID in FIG. 19 represents the navigation terminal 3a that has made the request. In such a manner, in the present embodiment, not only geographic characteristic values but also data on creation date-time and reliability are simultaneously delivered as geographic characteristic value delivery data.

The geographic characteristic value update section 310 receives the delivered geographic characteristic value delivery data via the communication section 301, or from a CD-ROM or flash memory via the external media reading section 308 (S603).

Then, the geographic characteristic value update section 310 loops the processing in steps S605 to S609 for the respective links in the delivered data (geographic characteristic value delivery data) (S604).

First, the geographic characteristic value update section 310 compares a link number (target link number), which is a target for processing, in the geographic characteristic value delivery data having been delivered and link numbers in the geographic characteristic value DB 309 on the navigation terminal 3a, determines whether or not the target link number is absent in the geographic characteristic value DB 309 on the navigation terminal 3a, and thereby determines whether or not corresponding data is absent in the existing geographic characteristic values (S605).

As a result of step S605, if data corresponding to the target link number is absent in the existing geographic characteristic values (S605→Yes), then the geographic characteristic value update section 310 refers to the degree of reliability, corresponding to the target link number, in the geographic characteristic value delivery data, and determines whether or not this degree of reliability is greater than or equal to a threshold being set in advance (S606).

As a result of step S606, if the degree of reliability is greater than or equal to the threshold (S606→Yes), then the geographic characteristic value update section 310 performs data update processing to add the geographic characteristic values corresponding to the target link number into the geographic characteristic values on the navigation terminal navigation terminal 3a (S607).

As a result of step S606, if the degree of reliability is lower than the threshold (S606→No), then the geographic characteristic value update section 310 proceeds the processing to step S610 and performs processing on the next target link.

As a result of step S605, if corresponding data is present in the existing the geographic characteristic values (S605→No), in other words, if data on the geographic characteristic values related to the target link number is already present in the geographic characteristic value DB 309 on the navigation terminal 3a, then the geographic characteristic value update section 310 compares the creation date-time corresponding to the target link number in the geographic characteristic value delivery data and the corresponding creation date-time in the geographic characteristic value DB 309 on the navigation terminal 3a, and determines whether or not the creation date-time in the delivery data (the geographic characteristic value delivery data) is later than the creation date-time in the existing data (the geographic characteristic value DB 309 on the navigation terminal 3a) (S608).

As a result of step S608, if the creation date-time in the delivery data (the geographic characteristic value delivery data) is not later than the creation date-time in the existing data (the geographic characteristic value DB 309 on the navigation terminal 3a) (S608→No), then the geographic characteristic value update section 310 proceeds the processing to step S610, and performs processing on the next target link.

As a result of step S608, if the creation date-time in the delivery data (the geographic characteristic value delivery data) is later than the creation date-time in the existing data (the geographic characteristic value DB 309 on the navigation terminal 3a) (S608→Yes), then the geographic characteristic value update section 310 determines whether or not the degree of reliability in the delivery data (the geographic characteristic value delivery data) is higher than the corresponding degree of reliability in the existing data (the geographic characteristic value DB 309 on the navigation terminal 3a) (S609).

As a result of step S609, if the degree of reliability in the delivery data (the geographic characteristic value delivery data) is higher than the corresponding degree of reliability in the existing data (the geographic characteristic value DB 309 on the navigation terminal 3a) (S609→Yes), then the geographic characteristic value update section 310 proceeds the processing to step S607, performs data update processing to replace the geographic characteristic values, of the corresponding link, in the geographic characteristic value DB on the navigation terminal 3a by the delivered geographic characteristic values (S607), and then proceeds the processing to step S610.

As a result of step S609, if the degree of reliability in the delivery data (the geographic characteristic value delivery data) is not higher than the corresponding degree of reliability in the existing data (the geographic characteristic value DB 309 on the navigation terminal 3a) (S609→No), then the geographic characteristic value update section 310 proceeds the processing to step S610 without performing the data update processing.

When the loop in steps S605 to S609 is completed for all the links in the delivery data (S610), then the geographic characteristic value update section 310 terminates the processing.

By selecting geographic characteristic values to be updated in such a manner, it is possible to avoid the risk of a fall in the data accuracy in the geographic characteristic value DB 309.

Route Search Processing

Figure 20:
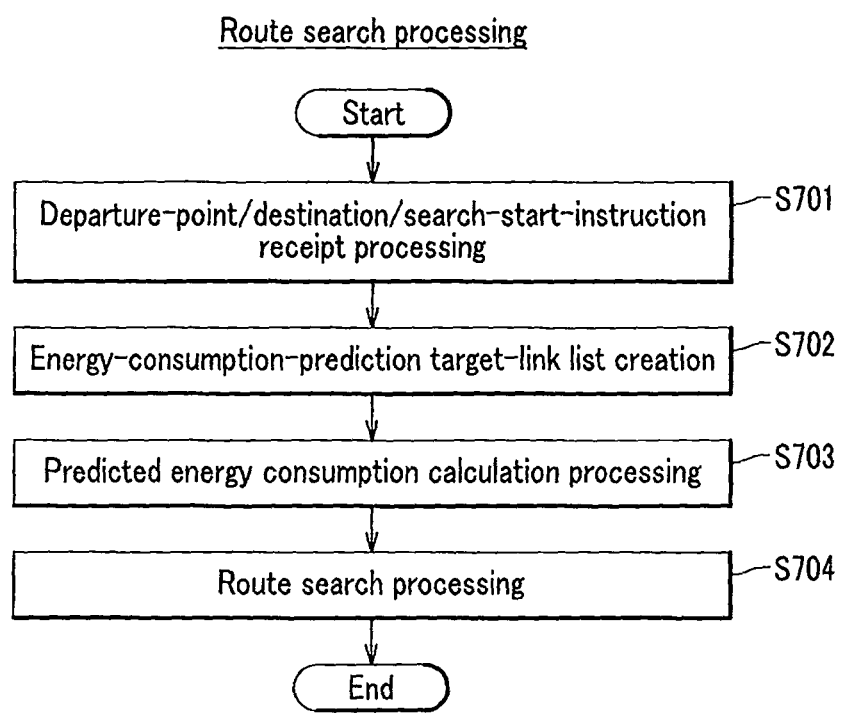
FIG. 20 is a flowchart showing a procedure of route search processing in the second embodiment.

FIG. 20 is a flowchart showing a procedure of route search processing in the second embodiment.

First, the route search section 305 performs departure-point/destination/search-start-instruction receipt processing to receive an input of a departure point/destination and of a route search start instruction from the user via the input section 303 (S701). Herein, the departure point is not limited to input data from the user, and may be the position of the vehicle itself obtained from the GPS receiving section 304.

Then, the route search section 305 creates a link list of targets for predicting energy consumption by processing similar to the processing in step S502 in FIG. 13 (S702), and delivers the created link list of targets for predicting energy consumption to the energy consumption prediction section 320.

The predicted energy consumption calculation section 322 performs predicted energy consumption calculation processing to calculate the predicted energy consumption of each link, based on the delivered link list of targets for predicting energy consumption and using the geographic characteristic values stored in the geographic characteristic value DB 309 (S703). The processing in step S703 is similar to that described with reference to FIG. 11, and accordingly description will be omitted.

Then the route search section 305 performs route search processing to search a route of the minimum energy consumption from the predicted energy consumptions and the information in the road map DB 307 (S704). The processing in step S704 is similar to that in step S505 in FIG. 13, and accordingly description will be omitted.

A result of route search as a result of step S704 is delivered to the route guide section 306.

Similarly to the route guide section 306, shown in FIG. 1, of the navigation terminal 3 in the first embodiment, the route guide section 306 provides the driver with a guidance, as shown in FIG. 14, based on the route search result, and provides a screen display of the predicted energy consumptions as shown in FIG. 15.

Summary of Second Embodiment

An energy consumption prediction system B that makes energy consumption, the energy consumption being predicted based on the actual driving results of probe vehicles 2, usable on the navigation terminal 3a of a vehicle as a service target through the above processing is realized by delivering geographic characteristic values to the navigation terminal 3a.

The difference between the first embodiment and the second embodiment will be described below. In the first embodiment, predicted energy consumption is delivered in response to a request from the navigation terminal 3. This is because predicted energy consumption is dependent on the vehicle parameters and the traffic status continuously changing, and accordingly, it is necessary that communication is performed each time of searching a route and thereby the navigation terminal 3 obtains the predicted energy consumption.

In contrast, in the second embodiment, geographic characteristic values are delivered to a navigation terminal 3. As the geographic characteristic values are independent from the vehicle parameters and traffic information, a set of geographic characteristic values is sufficient for one link, further, geographic characteristic values do not change unless the geographic characteristic values are recalculated, and accordingly, geographic characteristic values are less frequently updated compared with predicted energy consumptions continuously changing. These features enable reduction in the communication volume by delivering the geographic characteristic values.

Further, by storing geographic characteristic values in the navigation terminal 3a and performing prediction of energy consumption only on the navigation terminal 3a, another advantage is obtained that it is unnecessary to communicate with the navigation server 1a each time of searching a route.

Still further, in the present embodiment, it is possible to calculate geographic characteristic values from a topographic map such as a contour map described in Japanese Patent Application No. 2008-281968, and combination of the calculated geographic characteristic values with a technology for calculating predicted energy consumption is possible.

Yet further, in the present embodiment, a route guidance is displayed on the output section 30, as shown in FIGS. 14 and 15, however, without being limited thereto, a route guidance may be provided with the output section 302 as an audio device for audio output, or the output section 302 may have a function of a display device and a function of an audio device to simultaneously provide a route guidance display and an audio guidance.

According to the invention, it is possible to predict energy consumptions of a vehicle, using geographic characteristic values which are independent from particular driving patterns and vehicle parameters and unique to respective links.

What is claimed is:

1. A method of predicting energy consumption by a system for predicting energy consumption, the system having an energy consumption prediction apparatus and at least one terminal apparatus, wherein the energy consumption prediction apparatus delivers data for route search to the terminal apparatus and the terminal apparatus performs route displaying, based on the delivered data, the method comprising:

the following steps performed by the energy consumption prediction apparatus:

calculating geographic characteristic values of each of the links that form a route, based on energy consumptions collected from probe vehicles of differing vehicle types, wherein geography of each link affects consumption energy thereof with the geographic characteristic values, and wherein the calculating of the geographic characteristic values removes an effect of the vehicle types on the geographic characteristics values of said each of the links;

receiving a prediction energy consumption request, including an indication of vehicle type, from the terminal apparatus;

calculating a predicted energy consumption of each link selected, as a prediction target of the prediction energy consumption request, based on the geographic characteristic values and the vehicle type included in the prediction energy consumption request; and delivering each predicted energy consumption having been calculated to the terminal apparatus;

and the following steps performed by the terminal apparatus:

outputting route guide information from an output section, based on the predicted energy consumptions having been delivered.

2. The method of predicting energy consumption according to claim 1, wherein the geographic characteristic values are calculated, based on a value of effect on energy consumption during acceleration, a value of effect on energy consumption during deceleration, and a value of effect on energy consumption during driving at a constant velocity.

3. The method of predicting energy consumption according to claim 1, further comprising:

the following steps performed by the energy consumption prediction apparatus, obtaining travel times of the links from the probe vehicles;

calculating driving patterns, each of which is a pattern with respect to acceleration/deceleration and a constant velocity of the corresponding probe vehicle, the calculation being performed from the obtained travel times of the respective links; and calculating the geographic characteristic values, based on the driving patterns and the energy consumptions.

4. The method of predicting energy consumption according to claim 3, wherein each driving pattern is an acceleration/deceleration probability, being a ratio of a distance consumed by the acceleration or the deceleration of the probe vehicle to a corresponding link length.

5. The method of predicting energy consumption according to claim 1, wherein each energy consumption includes driving energy consumption and basic energy consumption;

driving energy consumption is energy consumption contributing to variation in mechanical energy of a vehicle; and basic energy consumption is energy consumption due to internal resistance of an internal combustion engine and onboard devices of the vehicle.

6. The method of predicting energy consumption according to claim 1, wherein each energy consumption includes driving energy consumption and basic energy consumption;

if a vehicle is an electric vehicle, driving energy consumption is mechanical energy of the vehicle including energy due to regeneration; and basic energy consumption is energy consumption by onboard devices of the vehicle.

7. The method of predicting energy consumption according to claim 1, wherein the output section is a display device that displays information;

and wherein the terminal apparatus performs a route search, with the predicted energy consumptions delivered from the energy consumption prediction apparatus as costs of the respective links which are targets for the route search, and displays a result of the route search as the route displaying on the output section.

8. The method of predicting energy consumption according to claim 1, wherein the output section performs the route displaying, with relations between data on the predicted energy consumptions, and the links for which the predicted energy consumptions have been calculated.

9. An apparatus for predicting energy consumption, the apparatus delivering data for route search to a terminal apparatus, comprising:

a geographic characteristic value generation section configured to calculate geographic characteristic values of each of the links that form a route, based on energy consumptions collected from probe vehicles of differing vehicle types, wherein geography of each link affects consumption energy thereof with the geographic characteristic values, and wherein in a calculating of the geographic characteristic values, the geographic characteristics value generation section removes an effect of the vehicle types on the geographic characteristic values of said each of the links;

a request receiving section configured to receive a prediction energy consumption request including an indication of vehicle type, from the terminal apparatus;

a predicted energy consumption calculation section configured to calculate predicted energy consumption of each link selected as a prediction target of the prediction energy consumption request, based on the geographic characteristic values and the vehicle type included in the prediction energy consumption request; and a communication section configured to deliver the predicted energy consumptions having been calculated to the terminal apparatus.

* * * * *